(12) United States Patent
Covington et al.

(10) Patent No.: US 7,325,196 B1
(45) Date of Patent: Jan. 29, 2008

(54) METHOD AND SYSTEM FOR MANIPULATING PAGE CONTROL CONTENT

(75) Inventors: Clinton Dee Covington, Kirkland, WA (US); Greg Lindhorst, Seattle, WA (US); Andrew R. Miller, Issaquah, WA (US); Jay L. Massena, Bellevue, WA (US); Stephen I. Lesser, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 10/463,318

(22) Filed: Jun. 16, 2003

(51) Int. Cl.
*G06F 17/00* (2006.01)

(52) U.S. Cl. ............... 715/531; 715/515; 715/520

(58) Field of Classification Search ........ 715/531, 715/515
See application file for complete search history.

(56) References Cited

U.S. PATENT DOCUMENTS

| | | | |
|---|---|---|---|
| 5,907,837 A * | 5/1999 | Ferrel et al. | 707/3 |
| 6,701,440 B1 * | 3/2004 | Kim et al. | 713/201 |
| 6,832,263 B2 * | 12/2004 | Polizzi et al. | 709/246 |
| 2002/0004908 A1 * | 1/2002 | Galea | 713/200 |
| 2002/0129106 A1 * | 9/2002 | Gutfreund | 709/205 |
| 2004/0070609 A1 * | 4/2004 | Estrada | 345/751 |

OTHER PUBLICATIONS

Hazra, "Building Enterprise Portals: Principles to Practice", ICSE 2002, May 2002, Orlando, Florida, copyright 2002 ACM, p. 623-633.*
Smith, et al., "ABC: A Hypermedia System for Artifact-Based Collaboration", Hypertext 1991 Proceedings, Dec. 1991, p. 179-192.*
Microsoft Corporation; Digital Dashboard Resource Kit 3.0 Documentation, May 2001.

* cited by examiner

*Primary Examiner*—William Bashore
*Assistant Examiner*—Amelia Rutledge
(74) *Attorney, Agent, or Firm*—Merchant & Gould

(57) ABSTRACT

A page is generated in a computer-based format that includes zones in which controls are inserted. The controls can present information or data that the controls obtain from one or more sources. Features such as the location, quantity, and properties of the zones and the controls can be set as desired when creating the page. Furthermore, the page can be created using a graphical layout. The page can be accessed in a computer-based environment, and properties of the controls, such as the size, position, or classification of presented information, can be manipulated while the page is being accessed.

34 Claims, 19 Drawing Sheets

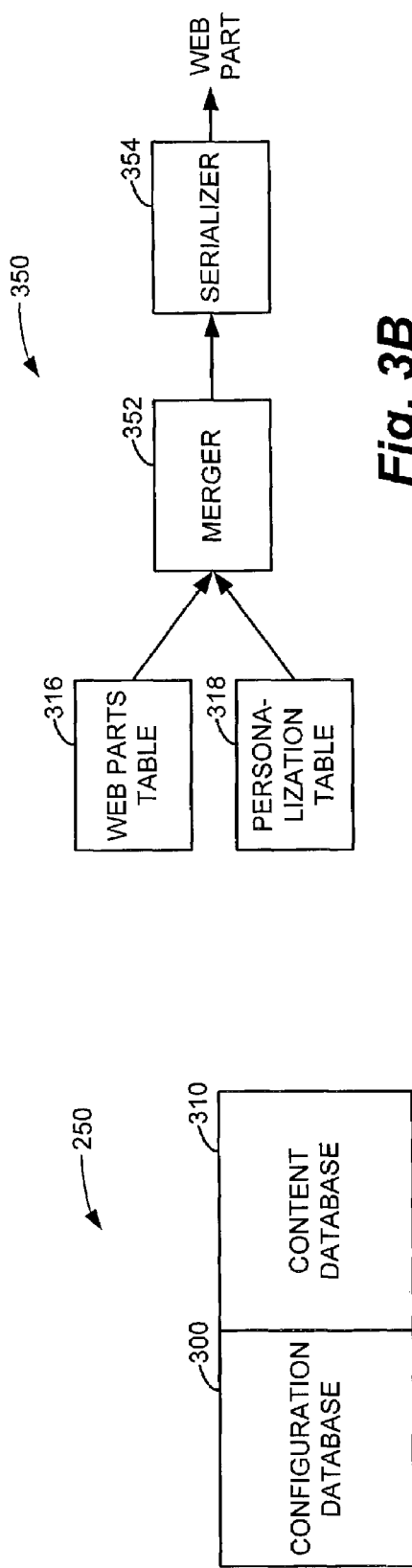
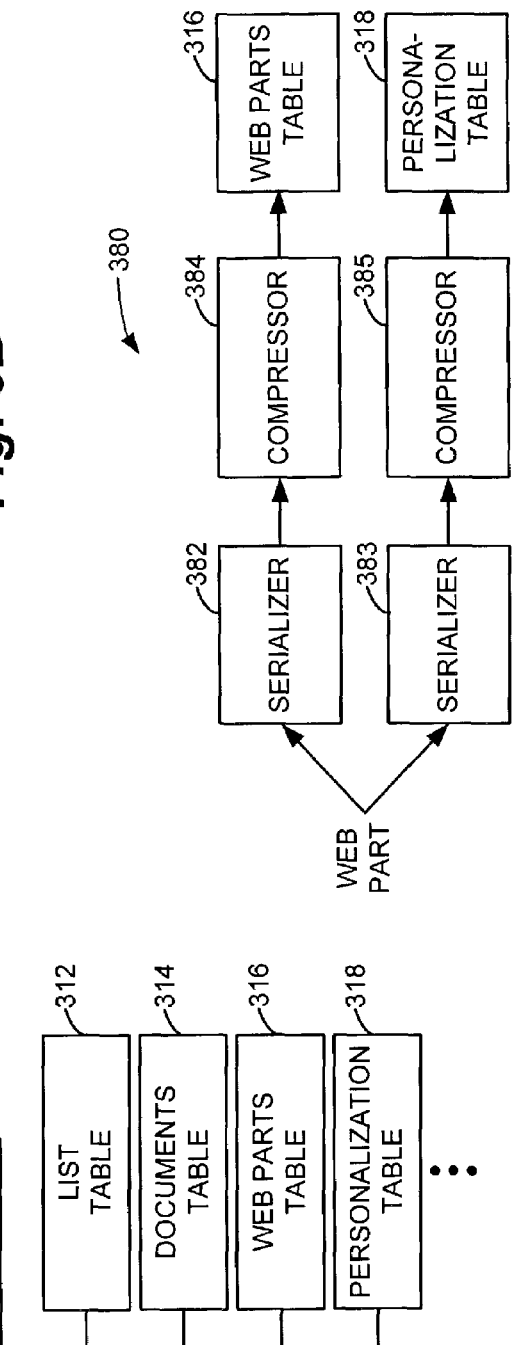
*Fig. 3B*
*Fig. 3C*
*Fig. 3A*

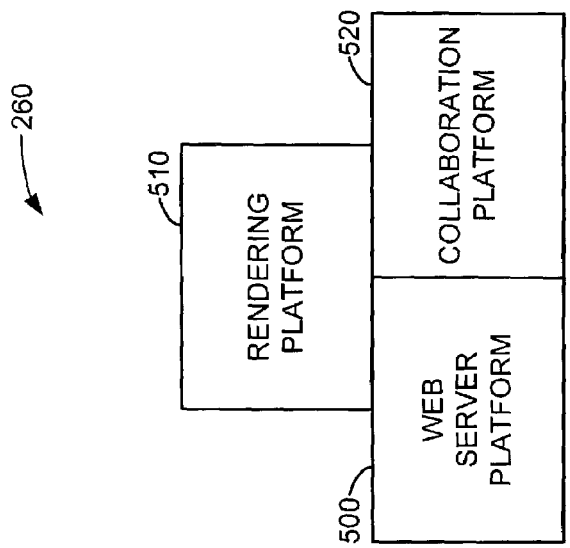

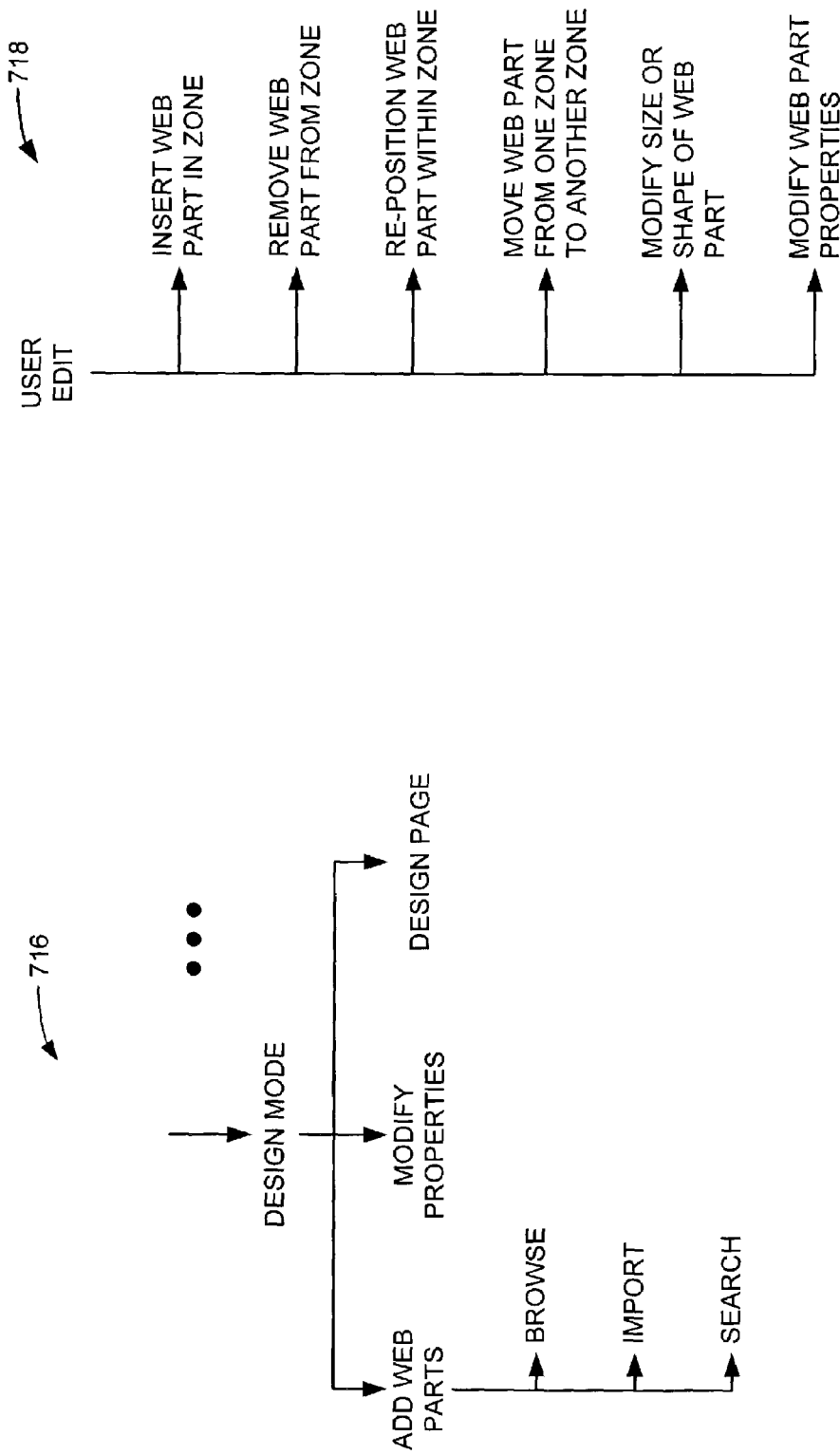

─ 2000

1  PAGE REGISTRATION:

2    Web Part Page = Microsoft.SharePoint.WebPartPage

3    <HTML DECLARATION>

4      <HEADER>

5      <BODY>

6        <Web Part Page : Web Part Zone>

7      </BODY>

8    </HTML>

*Fig. 20*

METHOD AND SYSTEM FOR MANIPULATING PAGE CONTROL CONTENT

CROSS REFERENCES TO RELATED APPLICATIONS

This application is related to co-pending U.S. patent application entitled "Method and System for Providing Page Control Content," filed concurrently with this application on Jun. 16, 2003 and accorded Ser. No. 10/463,825, and to the co-pending U.S. patent application entitled "Method and System for Customizing and Personalizing Page Control Content," also filed concurrently with this application on Jun. 16, 2003 and accorded Ser. No. 10/463,779.

TECHNICAL FIELD

The present invention is generally directed to software used for access and management of information. More specifically, the present invention can manipulate page control content in a computer-based environment.

BACKGROUND OF THE INVENTION

The advent of computer-based client-server platforms, such as platforms for the collaborative access and management of information, has been an important development to the success of modern organizations. Many modern organizations, such as businesses, government entities, or educational institutions, are structured into groups, teams, or other units. These organizational units typically have responsibilities and needs (i.e., interests) that are related to various forms of information or data. As a simple example, a modern technology business may be broadly structured into a research group, which has interests in information regarding research objectives, a design group, which has interests in information regarding product development, and a marketing group, which has interests in information regarding customer product needs.

Since the units of modern organizations may be required to work together on shared or related projects, the information interests of these units may also need to be shared among them. Thus, for example, the design group and the marketing group may need to share their information interests while working on a common project to design and market a line of products to customers. Computer-based client-server platforms, such as computer-based collaboration, platforms, have made it possible for organizational units to collaboratively manage and share their information interests in such a common interaction situation. For example, product development information may be managed by the design group and shared with the marketing group to facilitate the common project. Similarly, customer product-need information may be managed by the marketing group and shared with the design group to support the project. Using a computer-based collaboration platform, the two groups can accomplish this collaboration over a typical computer network.

However, in many collaboration situations, such as the previous example, members of the participating groups may need to manipulate some of the shared information. For example, a member may need to modify the information that is presented or the way it appears when accessed by one member (i.e., on a personal basis) or by all members (i.e., on a shared basis) of the groups. Some members of the marketing group, in the previous example, may occasionally need to update some of the design group's product development information in relation to the common project. These updates may need to be seen by all members of both the design group and the marketing group. As another example, a particular member of the design group may only need to view the marketing group's customer product-need information for certain products in the product line, in relation to the common project, while other members of the design group may need to see all of the customer product-need information.

Existing approaches to computer-based collaboration have attempted to meet the needs of group members to manipulate information, on a personal or shared basis, for their group and/or other groups they are working with. For example, existing approaches may provide a group member who creates a page (or document) of information (i.e., a page author) with the ability to create a page that includes page control content (e.g., modules or routines that display information or data) that all group members involved in the common project can view and that can be modified by the page author. However, these existing approaches typically only provide a page author with a limited selection of page templates that have fixed features for locations, quantities, and other properties regarding the page control content that can be included on the page. Furthermore, existing approaches may require a page author to create and/or modify the page control content or other features of a page by manually drafting the computer code that represents the page.

As another example, existing approaches may provide a group member who accesses a page of information (i.e., a user) with the ability to modify the properties of control content contained in an existing page that the user accesses. For instance, if the page includes control content that displays overall production data, a user may be able to modify the object to show production data for a particular product. However, such existing approaches typically require a user to have the abilities of a page author, as discussed above, in order to modify control content on the page. Thus, the user may also be limited in the ability to modify control content on a page, and the user may be required to manually draft code to make such changes. Existing approaches also typically do not allow the user to modify control content on a page in real-time while viewing the page. Thus, a user may not be able to view changes to the page control content as they are made.

In view of the foregoing, there is a need in the art for computer-based collaboration that allows a page author to determine the locations, quantities, and other properties of page control content and other page features according to the author's preferences. A need also exists to allow a page author to create pages with control content without the need to draft the underlying page code. A further need exists for computer-based collaboration that allows a user to modify properties of page control content without the need to have the abilities of a page author. Moreover, a need exists to allow a user to modify properties of page control content in real-time, while accessing the page.

SUMMARY OF THE INVENTION

The present invention can manipulate control content in a page, such as a web page, a word processing document, a spreadsheet, a database record, etc. The control content typically includes controls (e.g., modules or routines that display information or data) that can be customized by a user and that can display data from one or more sources, which may be local or remote to the user. The page typically includes one or more regions or zones that can contain the control content and that can be configured by a page author to allow the user to manipulate various properties of the contained control content.

In a typical aspect of the present invention, a page is created in a computer-based format. Typically, the page is created to present information to a group of users who have a common interest, such as work project. One or more zones are created on the page, and each zone is configured to contain a control. A control can be described as a computer-based module or routine that presents information or data that it collects from at least one source. The zones are created on the page to provide regions on the page where controls can be added, removed, or modified (i.e., manipulated). The controls provide a way for users of the page to receive information that can be updated without changing the format of the page.

The page author can choose to insert one or more controls into the one or more of the zones that are created on the page, in order to design the page to display certain information using the controls. The page author has flexibility in deciding the number, location, and properties of the zones that the author creates on the page. Furthermore, the author has the option to create the page using a graphical layout.

A user can access the page in a computer-based environment. For example, the user can use a computer program to access the page. Typically, the user will access the page to review information presented on it and/or to make changes to the page. In this regard, the user can manipulate one or more properties of the controls on the page. For example, the user can change the position of the control within a zone or to another zone on the page. As another example, the user can select one or more options that affect the category or classification of the information that is displayed by one or more of the controls.

These and other aspects of the invention will be described further in the detailed description below in connection with the drawing set and claim set.

BRIEF DESCRIPTION OF THE DRAWINGS

FIG. 3A is a block diagram illustrating a component architecture for a database server constructed in accordance with an exemplary embodiment of the present invention.

FIG. 3B is a block diagram illustrating a component architecture for the deserialization of page control content constructed in accordance with an exemplary embodiment of the present invention.

FIG. 3C is a block diagram illustrating a component architecture for the serialization of page control content constructed in accordance with an exemplary embodiment of the present invention.

FIG. 4 is a table diagram illustrating a component architecture for a database table configured in accordance with an exemplary embodiment of the present invention.

FIG. 5 is a block diagram illustrating a component architecture for a web server constructed in accordance with an exemplary embodiment of the present invention.

FIG. 12 is a diagram illustrating page editing modes in accordance with an exemplary embodiment of the present invention.

FIG. 13 is a diagram illustrating page editing options in accordance with an exemplary embodiment of the present invention.

FIG. 20 illustrates a general outline of HTML code for a page with content manipulation zones in accordance with an exemplary embodiment of the present invention.

DETAILED DESCRIPTION OF THE EXEMPLARY EMBODIMENTS

Figure 1:
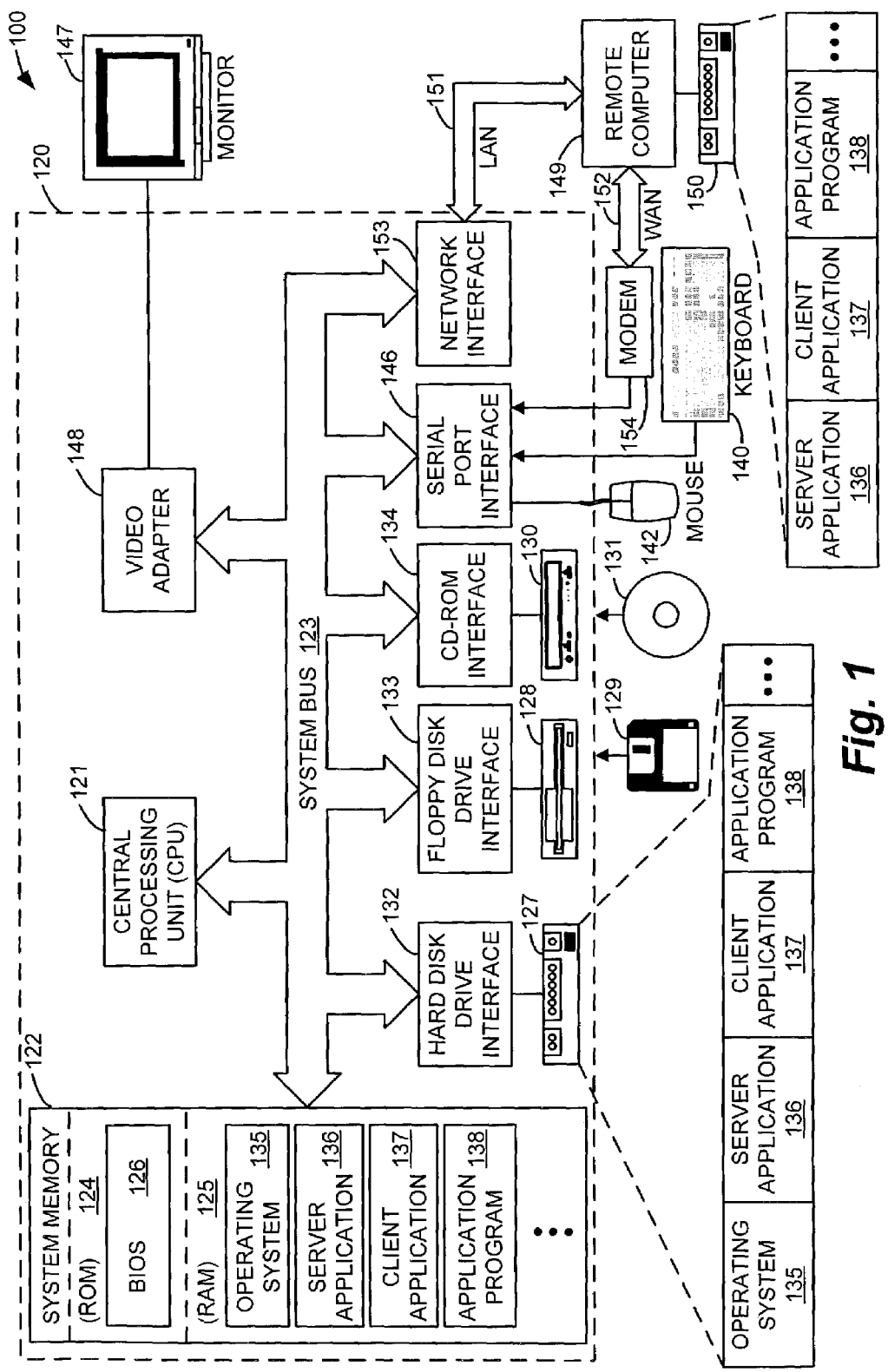
FIG. 1 is a block diagram illustrating an exemplary operating environment for implementation of various embodiments of the present invention.

The present invention enables a user to manipulate control content in a page, such as a web page, a word processing document, a spreadsheet, a database record, etc. (i.e., a page or document in a computer-coded or electronic format). The control content typically comprises controls (e.g., modules or routines that display information or data) that can be customized by the user and that can display data from one or more sources, which may be local or remote to the user. The page typically includes one or more regions or zones that can contain the control content and that can be configured by a page author to allow the user to manipulate various properties of the contained control content.

According to an exemplary embodiment of the present invention, an author can create a page, for example, using a server application, which can provide data to a client application. The author can create content manipulation zones on the page that can be configured to contain the above described customizable control content and allow a user to manipulate this content. A user can request the page, for example, using a client application. The user can manipulate the control content in the zones on the page to, for example, modify various properties of the content, such as the positions of the content within the zones and the data that is displayed by the content.

Existing approaches typically provide a page author with a limited selection of page templates with fixed locations, quantities, and other properties for control content and other page features. In contrast, exemplary embodiments of the present invention allow a page author to determine the locations, quantities, and other properties of zones, control content, and other page features in accordance with the author's intentions. Furthermore, exemplary embodiments of the present invention allow the page author to graphically create a page with content manipulation zones for control content, without the need to write underlying page code. Existing approaches also typically limit or prevent a user from manipulating control content after a page has been created. In contrast, exemplary embodiments of the present invention allow a user to manipulate many properties of the page control content, including the position of the content on the page and the data that is displayed by the content. Furthermore, in contrast to existing approaches, exemplary embodiments of the present invention allow a user to manipulate properties of the page control content in real-time while accessing the page.

Although exemplary embodiments of the present invention will be generally described in the context of software modules and an operating system running on a personal computer, those skilled in the art will recognize that the present invention can also be implemented in conjunction with other program modules for other types of computer system configurations, including hand-held devices, multi-processor systems, microprocessor based or programmable consumer electronics, network person computers, minicomputers, mainframe computers, and the like. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices, and/or input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended logic flow diagrams (or flow charts). However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the present invention. The inventive functionality of the computer program will be explained in more detail in the following description in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 illustrates a representative operating environment 100 for implementation of an exemplary embodiment of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures, including a memory bus or memory controller, a peripheral bus, or a local bus, using any of a variety of bus architectures. The system memory 122 includes a read-only memory (ROM) 124 and a random access memory (RAM) 125. A basic input/output system (BIOS) 126, containing the basic routines that help to transfer information between elements within the personal computer 120, such as during start-up, is stored in the ROM 124.

The personal computer 120 further includes a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary operating environment 100 employs a ROM 124, a RAM 125, a hard disk drive 127, a removable magnetic disk 129, and a removable optical disk 131, it should be appreciated by those skilled in the art that other types of computer readable media which can store data that is accessible by a computer may also be used in the exemplary operating environment 100, such as magnetic cassettes, flash memory cards, digital video disks, Bernoulli cartridges, and the like. The drives and their associated computer readable media can provide nonvolatile storage of computer-executable instructions, data structures, program modules, and other data for the personal computer 120.

A number of modules may be stored on the ROM 124, RAM 125, hard disk drive 127, magnetic disk 129, or optical disk 131, including an operating system 135 and various application modules 136-138. Application modules may include routines, sub-routines, programs, platforms, objects, components, data structures, etc., which perform particular tasks or implement particular abstract data types. In accordance with an exemplary embodiment of the present invention, the application modules may include a server application 136 and a client application 137, which will be described in more detail with respect to FIG. 2. The application modules may also include an application program 138, such as a word processing, spreadsheet, or database program. Exemplary embodiments of the present invention will be described below with respect to the application modules 136-138, such as the server application 136 and the client application 137.

A user may enter commands and information to the personal computer 120 through input devices, such as a keyboard 140 and a pointing device 142. The pointing device 142 may include a mouse, a trackball, or an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus (USB), or the like. A display device 147, such as a monitor, may also be connected to system bus 123 via an interface, such as a video adapter 148. In addition to the display device 147, the personal computer 120 may include other peripheral output devices (not shown), such as speakers and a printer.

The personal computer 120 may operate in a networked environment using logical connections to one or more remote computers 149. The remote computer 149 may be another personal computer, a server, a client, a router, a network PC, a peer device, or other common network node. While the remote computer 149 typically includes many or all of the elements described above relative to the personal computer 120, only a memory storage device 150 has been illustrated in FIG. 1 for simplicity. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may also be stored in the remote memory storage device 150. For example, the remote memory storage device 150 may include a server application 136, client application 137, and application program 138. It will be appreciated that the network connections shown are exemplary and other means of establishing a communications link between the computers may be used.

Figure 2A:
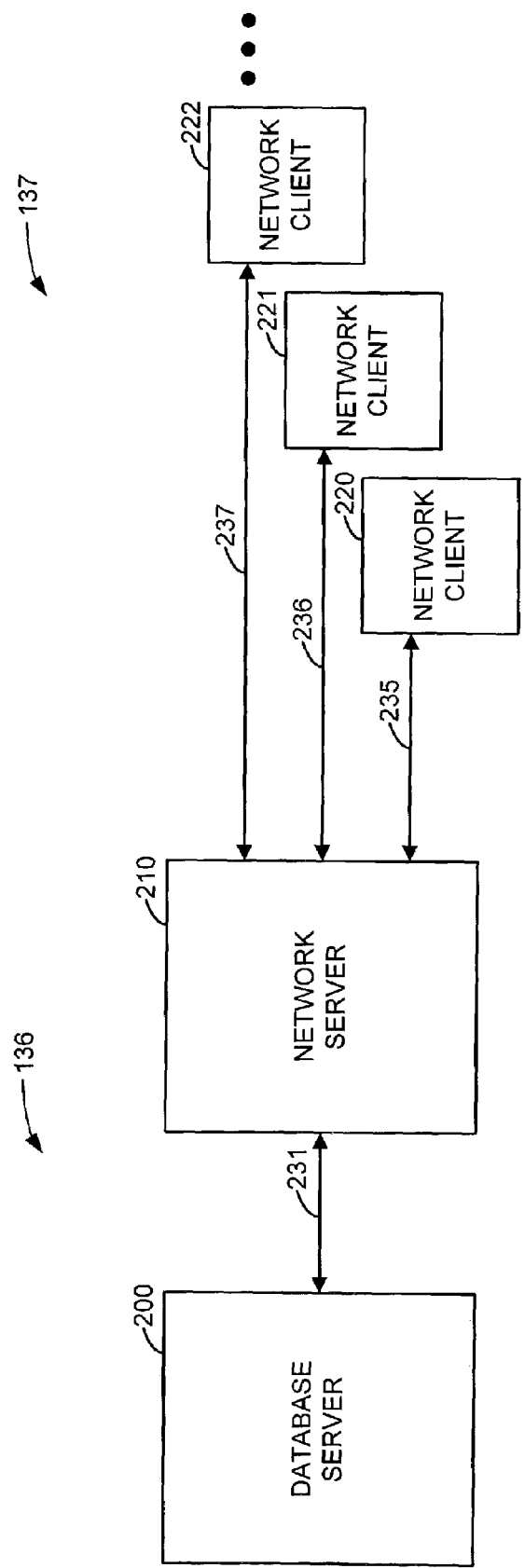
FIG. 2A is a block diagram illustrating a general component architecture for a server application and a client application constructed in accordance with an exemplary embodiment of the present invention.

Referring now to FIG. 2A, a block diagram is shown that illustrates a general component architecture for a server application 136 and a client application 137 constructed in accordance with an exemplary embodiment of the present invention. The server application 136 may include a database server 200 with a connection 231 to a network server 210. The client application 137 may include one or more network clients 220-222 that have connections 235-237, respectively, to the network server 210. The database server 200, network server 210, and network clients 220-222 may each operate on the same or individual computing devices, such as the computer 120 and remote computer 149 discussed above in FIG. 1. The connections 231, 235-237 may be implemented in various configurations, such as over an intranet, the Internet, or other types of computing networks. The connections 231, 235-237 may range from being distributed across a wide area to being contained within a single computing device.

The database server 200 typically stores data, for example in tables as database records. The database server 200 may include a database management system that manages the storage, retrieval, and organization of data. Throughout the discussion of exemplary embodiments of the present invention, it should be understood that the term "data" can refer to text, images, audio, video, or any other form of information that can exist in a computer-based environment, such as the operating environment 100 discussed above. The network server 210 typically interfaces users to data and various application modules. For example, users may connect to the network server 210 to access and manipulate data that is retrieved by one or more application modules of the network server 210. Users typically interface with the network server 210 using one or more network clients 220-222. The network clients 220-222 may include any program modules that can be used to interface a user to data. For example, the network clients 220-222 may include program modules such as web browser programs, word processing programs, file management programs, spreadsheet programs, database programs, etc.

In accordance with an exemplary embodiment of the present invention, a user may manipulate data using one or more of the network clients 220-222. For example, the user may initiate access to data that is stored on the database server 200 using one of the network clients 220-222. The network clients 220-222 can communicate the user's request for data along one or more of the connections 235-237, respectively, to the network server 210. One or more application modules of the network server 210 may communicate with the database server 200 along the connection 231 to facilitate the search for the data sought by the user. If located, the data can be transmitted from the database server 200 to the network server 210 along the connection 231. The network server 210 may process the data to place it in an appropriate format and then transmit it across one of the connections 235-237, respectively, to one of the network clients 220-222. The user can then manipulate the data using the one or more network clients 220-222. Changes to the data can be stored in the database server 200 by a similar process of communications between the network clients 220-222, the network server 210, and the database server 200.

In the subsequent discussion of exemplary embodiments of the present invention, references will be made to Internet and web related characteristics. These references are made merely to facilitate the description of exemplary embodiments of the invention and should not be interpreted as limiting the application of the embodiments of the present invention. It should be understood, as discussed above, that the embodiments of the present invention can be applied to different types of program modules, such as web browser programs, word processing programs, file management programs, spreadsheet programs, database programs, etc. It should also be understood that references throughout this discussion to an author or page author and to a user or page user may refer to the same or different persons, entities, etc. Moreover, although exemplary embodiments of the present invention are described herein in relation to computer-based collaboration platforms, exemplary embodiments of the present invention are not limited to such applications. For example, exemplary embodiments of the present invention can also be applied to other types of computer-based client-server platforms, such as web-browser-to-web-server platforms.

Figure 2B:
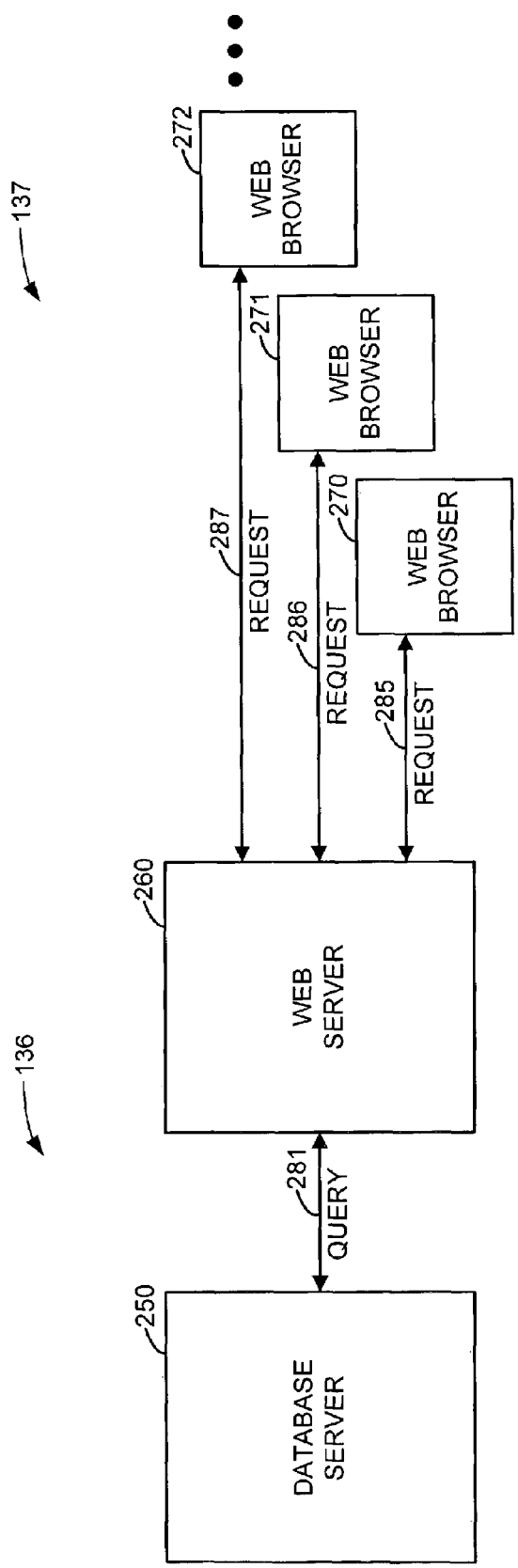
FIG. 2B is a block diagram illustrating a web-based component architecture for a server application and a client application constructed in accordance with an alternate exemplary embodiment of the present invention.

FIG. 2B illustrates a web-based component architecture for a server application 136 and a client application 137 constructed in accordance with an alternate exemplary embodiment of the present invention. As a web-based architecture, the components may communicate over an intranet and/or the Internet. Similar to the general component architecture of FIG. 2A, the server application 136 includes a database server 250 with a connection 281 to a web server 260. The client application 137 includes one or more web browsers 270-272 that have connections 285-287, respectively, to the web server 260. As discussed above, the database server 250 may store data in tables or other formats. The web server 260 typically interfaces users to data and may include several application platforms, which will be discussed in more detail with respect to FIG. 5. The web browsers 270-272 can include one or more programs that are capable of accessing data, for example, in the form of web pages that are transmitted across an intranet or the Internet.

A user can manipulate page control content, for example the control content of a web page, through the web-based component architecture of FIG. 2B, in accordance with an exemplary embodiment of the present invention. For example, a user can request data in the form of a web page using one or more of the web browsers 270-272. The web browser, for example, web browser 270, can send a request for the data to the web server 260 across the connection 285. Typically the request is made in an HTTP (hyper-text transport protocol) format. The request can be processed by the web server 260, which in turn can send a query to the database server 250 across the connection 281 for the data. An exemplary process for manipulating page control content using the exemplary architectures of FIGS. 2A and 2B will be described below with respect to FIG. 6.

FIG. 3A is a block diagram illustrating a component architecture for the database server 250 of FIG. 2B constructed in accordance with an exemplary embodiment of the present invention. The exemplary architecture 250 includes a configuration database 300 and a content database 310. Each database 300, 310 may include one or more tables for holding data and/or references to data in other tables. For example, the configuration database 300 typically includes tables (not depicted) that hold configuration data such as properties and administrative settings that apply to various functions of the database server 250. As depicted in FIG. 3A, the content database 310 may include tables such as a list table 312, a documents table 314, a web parts table 316, and a personalization table 318. Although not depicted in FIG. 3A, it is noted that the database server 250 can include more than one content database 310 in accordance with exemplary embodiments of the present invention.

The list table 312 of the content database 310 typically holds data that can be presented by web parts, which will be discussed below with respect to the web parts table 316. For example, the list table 312 may hold tabular data, such as tasks, announcements, and links. The list table 312 may also contain data that is referenced in other tables, such as the documents table 314. The documents table 314 typically holds data that comprises web page documents or web pages, for example in HTML (i.e., hyper-text markup language) format. Each web page stored in the documents table 314 may have a document identification reference or document ID.

Figure 16:
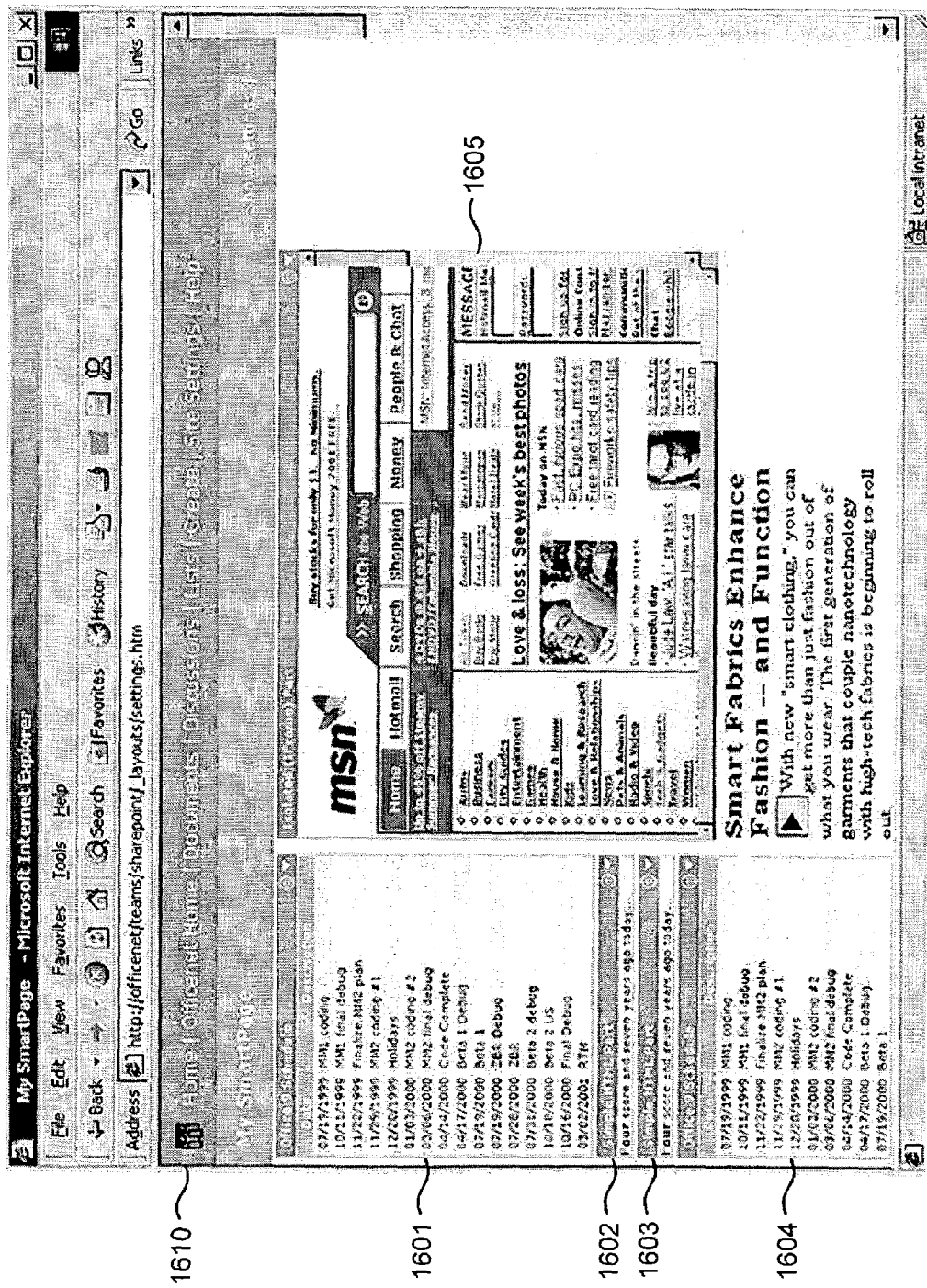
FIG. 16 is a web browser screen view of a page with representative control content in a viewing mode according to an exemplary embodiment of the present invention.

The web parts table 316 and the personalization table 318 typically store data for web parts. Web parts can include customizable control content that can be inserted into a web page by a page author or user. For example, web parts can be customizable web form controls that display data from one or more sources. An exemplary web part may display weather information based on data from several weather information sources, and the information may be customized to relate to a particular region or condition. Another exemplary web part may display stock information from several popular stock sources, and the information may be customized to relate to particular stocks or types of stocks. Referring to FIG. 16, an exemplary web page 1600 is shown that includes exemplary web parts 1601-1605.

Some web parts can be controls that are configured to manipulate data. For example, an exemplary web part may be configured to calculate data related to a loan, such as the loan payment, loan interest, etc. Additionally, other web parts can be controls that are configured to accept data, for example from a user input, and transmit such data to other web parts, servers (such as the web server 260), application programs (such as the application program 138), etc.

The web parts table 316 typically contains web parts data that can be accessed by all users of a web page that includes the web parts data, and this data can be referred to as "shared" web part data. The personalization table 318 typically contains web parts data that can be viewed by a particular user, and this data can be referred to as "personal" web parts data. As discussed above, a web page can include several web parts, and each web part can have several identification references or IDs that relate it to a web page. The concepts regarding web parts and their application to web pages in accordance with exemplary embodiments of the present invention will be discussed in further detail subsequently.

FIG. 3B is a block diagram illustrating a component architecture for the deserialization of page control content constructed in accordance with an exemplary embodiment of the present invention. The exemplary architecture 350 includes the web parts table 316 and the personalization table 318, which were described above for FIG. 3A. The architecture 350 also includes a merger 352 and a serializer 354. The merger 352 can merge or combine data (or properties) that is transmitted from the web parts table 316 and/or the personalization table 318. The serializer 354 processes merged data transmitted from the merger 352 to complete the deserialization of the data from the web parts table 316 and/or the personalization table 318 to generate a web part. The serializer 354 may serialize the merged data by, for example, converting it from a parallel format to a serial format. The web part that is generated by the serializer 354 can be inserted into a page as control content, as will be described below for FIGS. 6 and 11.

The serializer 354 can be implemented, for example, by a Microsoft®.NET ("dot-net") XML Serializer. In an exemplary embodiment of the invention that uses a Microsoft®.NET XML Serializer, the data is transmitted from the merger 352 to the serializer 354 in an XML ("extensible markup language) format. The serializer 354, in such an exemplary embodiment, serializes the data to generate a web part that is represented by code in an XML format. As will be discussed below for FIGS. 6 and 11, this code can be transmitted to a web browser 270-272 to insert a web part into a content manipulation zone on a page.

The exemplary architecture 350 allows exemplary embodiments of the invention to provide web parts with shared data (or properties) and/or personal data. The concepts of shared and personal web part data were introduced above for FIG. 3A and will also be described in further detail below. The exemplary architecture 350 can allow a page author or page user to manipulate a web part in several ways. For example, a web part can be customized so that all users of the web part can access the customized properties of the web part. Such a web part can be described as a shared web part, since all users of a page can typically access the web part. As another example, a web part can be personalized so that a web part that all users can access includes personalized features that a particular user can access. This web part can be described as a personalized web part, since although the web part has shared access by page users, it also has personalized properties that can be accessed by a particular user (such as the user who personalized the web part). A web part can also be manipulated so that it is only accessed on a page by a particular user and not by other users, thus, the web part may be included on a page for just that user. This web part can be described as a personal web part, since it can typically only be accessed (e.g., viewed and/or manipulated) by a particular user (such as the user who inserted the web part onto the page). Typically, a page author or page user manipulates shared web parts for access by all users of a page. A page user typically manipulates personalized web parts and/or personal web parts for access by the user.

FIG. 3C is a block diagram illustrating a component architecture for the serialization of page control content constructed in accordance with an exemplary embodiment of the present invention. The exemplary architecture 380 includes a plurality of serializers 382-383, which can be the same or substantially similar to the serializer 354 described for FIG. 3C. Thus, the serializers 382-383 can be implemented by a Microsoft®.NET XML Serializer. Although a plurality of serializers 382-383 are depicted, in some exemplary embodiments, the functions of the serializers 382-383 may be performed by a single serializer, which may also perform the functions of the serializer 354 described for FIG. 3B. The serializers 382-383 can obtain data (or properties) for a web part that is inserted on a page.

The exemplary architecture 380 also includes a plurality of compressors 384-385. The compressors 384-385 compress data that is received from the serializers 382-383. The compressors 384-385 may compress serialized data from the serializers 382-383 by, for example, reducing the size of the data through various compression techniques. For example, the data may be compressed by one of the various compression techniques that encodes the data and/or removes or replaces unnecessary portions of the data. Typically, by compressing the data, the compressors 384-385 facilitate more efficient storage of the data. The compressors 384-385 may be implemented in some exemplary embodiments by a Microsoft® XML Writer. In such exemplary embodiments, the compressors 384-385 are capable of reducing the size of XML code that represents a web part, for example, by removing verbose portions of the code.

The exemplary architecture 380 also includes the web parts table 316 and personalization table 318, which were described above for FIG. 3A. As will be discussed in further detail below for FIG. 11, web part data can be stored in the web parts table 316 and/or the personalization table 318 after the web part is manipulated by a page author or user. For example, data for a customized web part may be stored in the web parts table 316, and data for a personalized web part may be stored in the personalization table 318. As discussed above for FIG. 3A, data for a manipulated web part may be stored partially in each of the tables 316, 318 in some exemplary embodiments. For example, data related to the personalized aspects of a web part may be stored in the personalization table 318, while data related to the global aspects of the web part may be stored in the web parts table 316.

As discussed above, the exemplary architecture 380 allows exemplary embodiments of the invention to store data about web parts that have been manipulated, for example, while inserted on a page. This feature supports the capability of a page author and/or user to manipulate a web part for future access by one or more users of the web part and/or a page that includes the web part. The exemplary architecture 380, as well as the exemplary architecture 350 of FIG. 3B, allow a page author and/or user to manipulate page control content, such as web parts, without the need for predetermined options being set by a page author. Furthermore, these exemplary architectures 350, 380 allow a page author and/or user to manipulate control content on the page and have the manipulated properties stored with the controls (i.e., at the component level).

Typically, the creator of a web part, or web part developer, determines the shared or personal properties of a web part that can be manipulated by a page author or user. The web part developer may set such properties while creating the software code that represents a web part. For example, the developer may create code in HTML format that designates which properties of a web part can be manipulated or a shared and/or personal basis. This provides flexibility to the page author or user to manipulate web part properties, since the author or user can insert a web part on the page that provides the options for manipulation that are desired. It also avoids the need for the page author to change properties at the page level to affect the properties of web parts on the page. Thus, the properties for the web part are included with the web part at the component level.

FIG. 4 is a table diagram illustrating a component architecture for the web parts table 316 of FIG. 3A configured in accordance with an exemplary embodiment of the present invention. The exemplary web parts table 316 can include several rows R1, R2, R3, . . . and several columns C1, C2, C3, C4, C5, . . . . As depicted in FIG. 4, one column C1 of the web parts table 316 may contain data related to the properties of web parts. A second column C2 of the table 316 may contain page or document IDs that relate a web part to a web page that is referenced in the documents table 314 and the list table 312. A third column C3 of the web parts table 316 may include web part IDs that are used to reference a particular web part. Zone identification references or zone IDs can be included in a fourth column C4 of the web parts table 316. Column C5 may include user identification references or user IDs. As will be discussed further below, zones are page objects that can be populated with web parts. For example, zones can be embedded within web pages by an author to allow a user to insert web parts on the web pages. Further discussion regarding the concept of zones will be presented subsequently.

Referring to row R2 of the exemplary web parts table 316, the first column C1 of row R2 can contain the "state" of a web part. The state of a web part can be defined by the current properties of the web part. The second column C2 of row R2 contains an exemplary document ID, "D_ID_1." As discussed above, this exemplary document ID can refer to a web page that has data stored in the documents table 314 and the list table 312. An exemplary web part ID, "WP_ID_1," is contained in the third column C3 of row R2 of the exemplary web parts table 316. This web part ID can refer to a particular web part that is stored in the web parts table 316. The fourth column C4 of row R2 contains an exemplary zone ID, "Z_ID_1." This zone ID can refer to a zone in one or more web pages stored in the documents table 314 and/or the list table 312. The concepts of the property or state, document ID, web part ID, and zone ID associated with web parts will be discussed in further detail subsequently.

The fifth column C5 of row R2 contains an exemplary user ID, "U_ID_1." As discussed above for FIGS. 3B-3C, the user ID can be used to designate a personal web part, which has been inserted on a page for a particular user to access while accessing the page. Other users typically do not have access to this web part (e.g., to view and/or manipulate the web part) while accessing the page. The user ID can also be used to designate a personalized web part, which is a shared web part that has been personalized with properties that can be accessed by a particular user. Although other users can access the web part on the page, the personalized properties of the web part can typically only be accessed by a particular user, such as the user who personalized the web part. Typically, the user ID for a personalized web part is represented in the user ID column (not shown) of the personalization table 318 and linked to the corresponding row (e.g., row R2) of the web parts table 316, since multiple users can personalize a web part according to exemplary embodiments of the present invention. If a web part is not a personalized or personal web part, the user ID may be a null or default entry, since the web part does not include any personal properties that have a limited access. Thus, the user ID allows exemplary embodiments of the invention to facilitate personalization of a web part by a user at the component level of the page.

FIG. 5 is a block diagram illustrating a component architecture for the web server 260 of FIG. 2B constructed in accordance with an exemplary embodiment of the present invention. The exemplary architecture 260 includes a web server platform 500, a rendering platform 510, and a collaboration platform 520. The web server platform 500 is typically implemented by an application platform that executes web server code. For example, the web server platform 500 may be implemented by the Microsoft® Internet Information Server (IIS) platform. The web server platform 500 typically performs web server functions, such as processing HTTP requests from one or more web browsers 270-272.

The rendering platform 510 is typically implemented by an application platform that executes code for rendering data to a program module. The rendering platform 510 may be implemented, for example, by the Microsoft® ASP.NET platform, which is an active server page (ASP) platform. Typically, the rendering platform 510 performs rendering functions, such as rendering data to a web browser in response to an HTTP request from one or more web browsers 270-272.

Typically, the collaboration platform 520 can be implemented by an application platform that executes code for organizational collaboration. For example, the collaboration platform 520 may be implemented by the Microsoft® SharePoint™ Team Services (STS) platform or the Microsoft® Windows® SharePoint™ Services (WSS) platform. A business that includes several teams that store and utilize data from one or more sources may utilize the collaboration platform 520 to allow the teams to share access and management of the data. For example, team members may interface with the collaboration platform 520 using the web browsers 270-272 to access and manage team information from multiple sources.

The web server platform 500, rendering platform 510, and collaboration platform 520 typically operate together to provide the functions of the web server 260 discussed above for FIG. 2B. Further discussion about the functions of these exemplary components 500, 510, 520 of the web server 260 will be presented subsequently.

In the subsequent discussion of exemplary embodiments of the present invention, references will be made to elements of FIGS. 1-5 as applicable to facilitate the description of exemplary aspects and embodiments of the present invention. With respect to the exemplary processes that are described herein, certain steps in these processes may naturally precede others for the exemplary embodiments of the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 6:
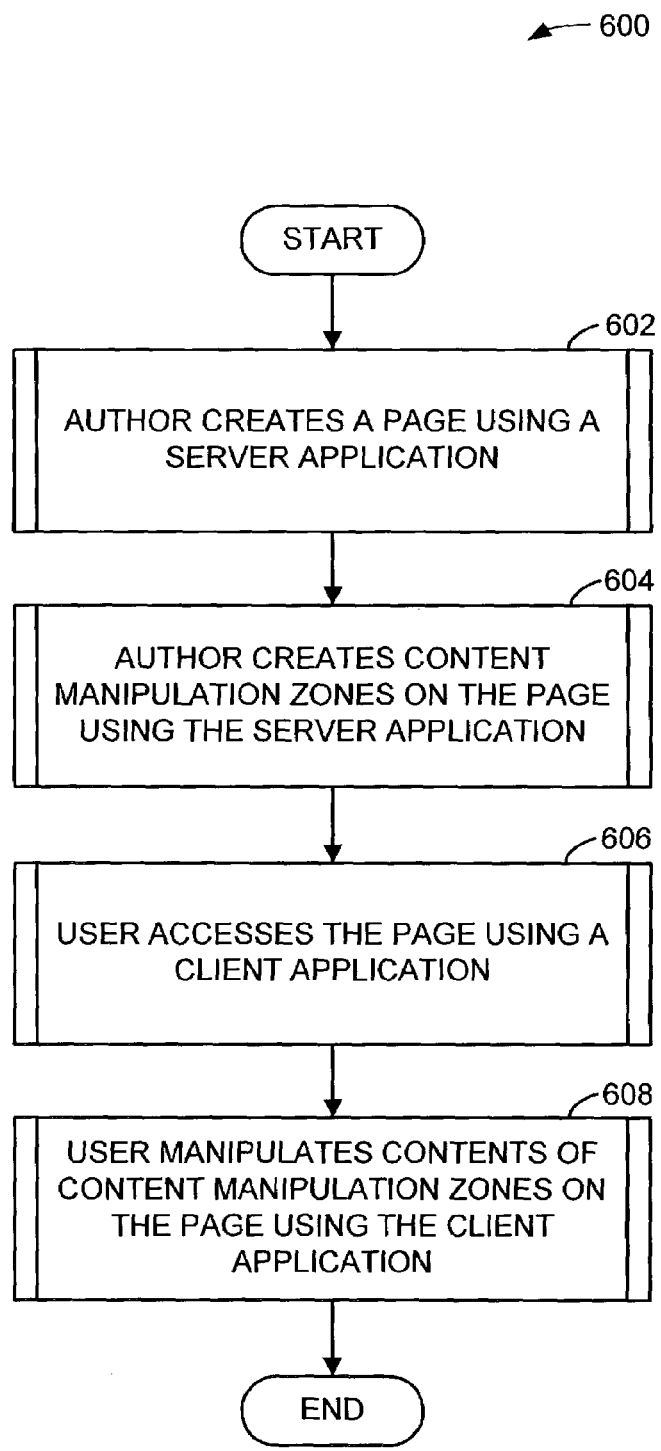
FIG. 6 is a logic flow diagram illustrating an overview of a process for manipulating page control content according to an exemplary embodiment of the present invention.

In that regard, reference is now made to FIG. 6, which is a logic flow diagram that illustrates an overview of a process for manipulating page control content according to an exemplary embodiment of the present invention. The exemplary process 600 begins with routine 602 in which a page author creates a page using a server application 136. As discussed above, a page may be a document or web page that is accessed by a user using a client application 137. In that regard, FIG. 16 illustrates an exemplary web page 1600 that may be created by an author in routine 602. The page author typically has the ability and knowledge to design a page to meet any particular requirements or objectives.

In routine 604 of the exemplary process 600, the page author creates content manipulation zones on the page created in routine 602 using the server application 136. Content manipulation zones were described briefly above in the discussion of "zones" with respect to FIG. 4. In that regard, content manipulation zones (or zones) are objects that are embedded on a page and that can be populated with contents, such as web parts, which were discussed above with respect to FIGS. 3 and 4. A zone may also be viewed as a region of a page that is configured to hold control content. As will be discussed in further detail subsequently, zones can be configured to control the manipulation of control content with respect to the zones, for example the type of control content that can be added to a zone and the properties of the content that can be changed within a zone. Briefly referring to FIG. 17, an exemplary web page 1700 is shown that includes several zones 1701-1703 that contain web parts control content.

The exemplary process 600 continues with routine 606, in which a user accesses the page created in routine 602 using a client application 137. As discussed above with respect to FIG. 2A, the user may access the page, for example, using one or more web browser programs, word processing programs, file management programs, spreadsheet programs, database programs, etc. The user may access the page in routine 606 to access data that is presented from the page.

The exemplary process 600 concludes with routine 608 in which a user manipulates the control contents of one or more content manipulation zones on the page using the client application 137. Control contents of zones, such as web parts, can be manipulated to change various properties or characteristics such as the position or appearance of the contents and the type of data displayed by the contents. For example, a user can reposition control content within a zone or move control content from one zone to another zone. As another example, a user can modify the size, shape, or color of the control content as it appears within a zone. As yet another example, a user can modify the criteria for a category of the data presented by the control content or select a desired classification of information for the control content to display on the page. Examples of such modifications were discussed above with respect to FIG. 3A regarding the display of weather or stock information by control content. User options for manipulating control content are discussed further with respect to FIG. 7.

As discussed above with respect to routine 604, the user's ability to manipulate control contents in the zones may be controlled by the configurations made to the zones by the page author, for example during routine 604. In some exemplary embodiments of the present invention, a user may be provided some ability to manipulate properties of a zone or to add a zone to a page. The steps 602-608 of the exemplary process 600 may include one or more sub-steps. Some exemplary sub-steps of steps 602-608 will be discussed below with respect to FIG. 7.

Figure 7:
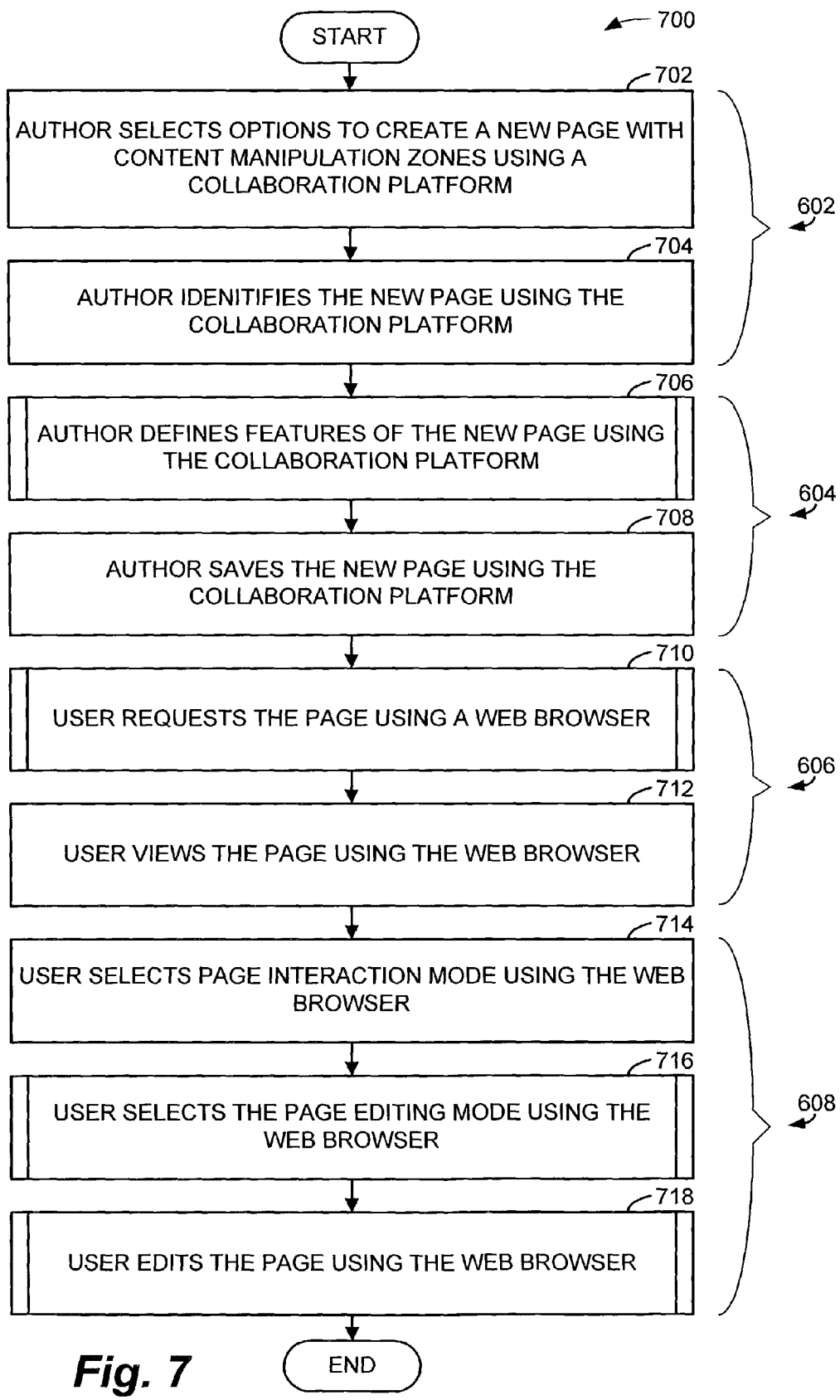
FIG. 7 is a logic flow diagram illustrating a process for manipulating page control content according to an exemplary embodiment of the present invention.

FIG. 7 is a logic flow diagram illustrating a process for manipulating page content according to an exemplary embodiment of the present invention. The exemplary process begins with step 702, in which a page author selects one or more options in a collaboration platform 520 to create a new page that includes content manipulation zones. As discussed for FIG. 5, the collaboration platform 520 may be the Microsoft® SharePoint™ Team Services collaboration platform or the Microsoft® Windows® SharePoint™ Services collaboration platform, which provides links and menus for page authoring options. The collaboration platform 520 may provide one or more page forms that facilitate the author to create the page graphically without drafting any underlying page code.

The process 700 proceeds to step 704, in which the page author identifies the new page using the collaboration platform 520. In this step 704, the collaboration platform 520 may offer the author the option to name the new page form so that it can be identified during subsequent manipulations. As indicated in FIG. 7, steps 702 and 704 may be exemplary sub-steps of routine 602 from FIG. 6.

Following step 704, in routine 706 of the process 700, the author defines features of the new page using the collaboration platform 520. As will be discussed in more detail with respect to FIG. 8, features of the page that are defined in routine 706 may include the page format, static and dynamic page content, and properties related to the content manipulation zones. The collaboration platform 520 may offer one or more templates within a page form that have predefined features for the page that can be modified according to the page author's intentions. These templates may provide visual cues that assist the author in further defining the features of the page. For example, an arrow cursor that is used in the collaboration platform 520 may change shapes and/or other appearances to indicate different options that are available to the author. As another example, sections of the page, such as the zones, may change in color or other appearance to indicate options that are available to the author to define features of the page.

In step 708 of the process 700, the author saves the new page using the collaboration platform 520. The page may be saved to a database server 200, 250. For example, the page may be saved to the content database 310 of the database server 250, which was described above for FIG. 3A. More specifically, the page may be saved to the documents table 314 and the list table 312 of the content database 310 for future access by a user. As discussed above for FIG. 3A, data for the page may be stored in the list table 312 and referenced by a record in the documents table 314. In some exemplary embodiments of the present invention, the page may be saved as a type "ASPX" document that can be rendered by a rendering platform 510 that is implemented using the Microsoft® ASP.NET platform application.

As indicated in FIG. 7, steps 706 and 708 may be sub-steps of routine 604 of FIG. 6. As further indicated, routine 706 may include sub-steps, some of which will be discussed for FIG. 8. It is also noted that, although the previous steps 702-708 have been described with respect to the use of a collaboration platform 520, such as the Microsoft® SharePoint™ Team Services collaboration platform or the Microsoft® Windows® SharePoint™ Services collaboration platform, these steps can be performed using other types of program modules. For example, steps 702-708 can be performed using a web page authoring program, such as the Microsoft® FrontPage® program. Such web page authoring programs may offer similar options and features to those discussed above with respect to a collaboration platform 520.

As another example, some or all of steps 702-708 can be performed using a text editor, such as a Microsoft® Notepad text editor, to manually write the appropriate code, for example in HTML format, that corresponds to one or more of the steps 702-708. In that regard, a general outline of HTML code for an exemplary page with content manipulation zones is illustrated in FIG. 20. This exemplary code outline 2000 will be described further with respect to FIG. 20. However, the code for the page is typically automatically generated by a collaboration platform 520 or web page authoring program based on the author's option selections within the program.

The process 700 continues after step 708 with routine 710, in which a user requests a page, such as the page created in steps 702-708, using one or more web browsers 270-272. As will be discussed further with respect to FIG. 10, the user's request in routine 710 may involve communication of the request between the web browsers 270-272 and a web server 260 and communication of a data query between the web server 260 and a database server 250. Typically, as a result of the request in routine 710, the data requested by the user is rendered as a page to one or more of the web browsers 270-272. Then, in step 712 of the process 700, the user can view the page using one or more of the web browsers 270-272. As discussed above, the user may view a page that looks similar to the exemplary page 1600 shown in FIG. 16. As indicated in FIG. 7, routine 710 and step 712 can represent exemplary subs-steps of routine 606 of FIG. 6. Furthermore, routine 710 may include sub-steps, some of which will be discussed for FIG. 9.

The process 700 continues from step 712 to step 714, in which the user selects a page interaction mode using a web browser 270-272. Typically, an option, such as a link or menu, is provided on the page to choose the page interaction mode. In an exemplary embodiment of the present invention, the user may choose to interact with the page in a shared properties mode or in a personal properties mode. In a shared properties mode, the user will be able to access properties of the page that can be accessed by all users of the page. Furthermore, modifications that are made to the page by the user in the shared mode can typically be accessed by all users of the page. In contrast, if the user chooses the personal properties mode, the user will be able to access personal properties, in addition to the shared properties, of the page. Furthermore, modifications that the user makes to the page in the personal mode can typically only be accessed by that user of the page. For example, as discussed above for FIG. 3A, a user may modify the properties of a web part that displays weather data, such as the region that the data applies to and the position of the web part in a zone, to meet the user's personal preferences. It should be appreciated that, in contrast to existing approaches, embodiments of the present invention allow a user to select between manipulating page control content that can be accessed by only the user (i.e., personal mode) or also by other users (i.e., shared mode), as discussed above.

Following step 714, in routine 716, the user selects a page editing mode using the web browser 270-272. As will be discussed in more detail below for FIG. 12, there may be several options available for page editing modes, such as options to add web parts to the page, modify properties of web parts on the page, or design other properties for the page. Depending on the page editing mode that the user selects, the user will be able to manipulate the content of the page accordingly. Typically, the page will include links and/or menus to allow the user to select from the various page editing mode options. Furthermore, the page may provide various visual cues, which will be discussed for FIG. 12, to assist the user in editing the page.

The process 700 concludes with routine 718, in which the user edits the page using the web browser 270-272. There are typically several options available to the user to edit the page, and these options will be discussed in more detail with respect to FIG. 13. As discussed above, these editing options may include changing the position or other properties of web parts on the page. As indicated in FIG. 7, steps 714-718 may represent sub-steps of routine 608 of FIG. 6.

Figure 8:
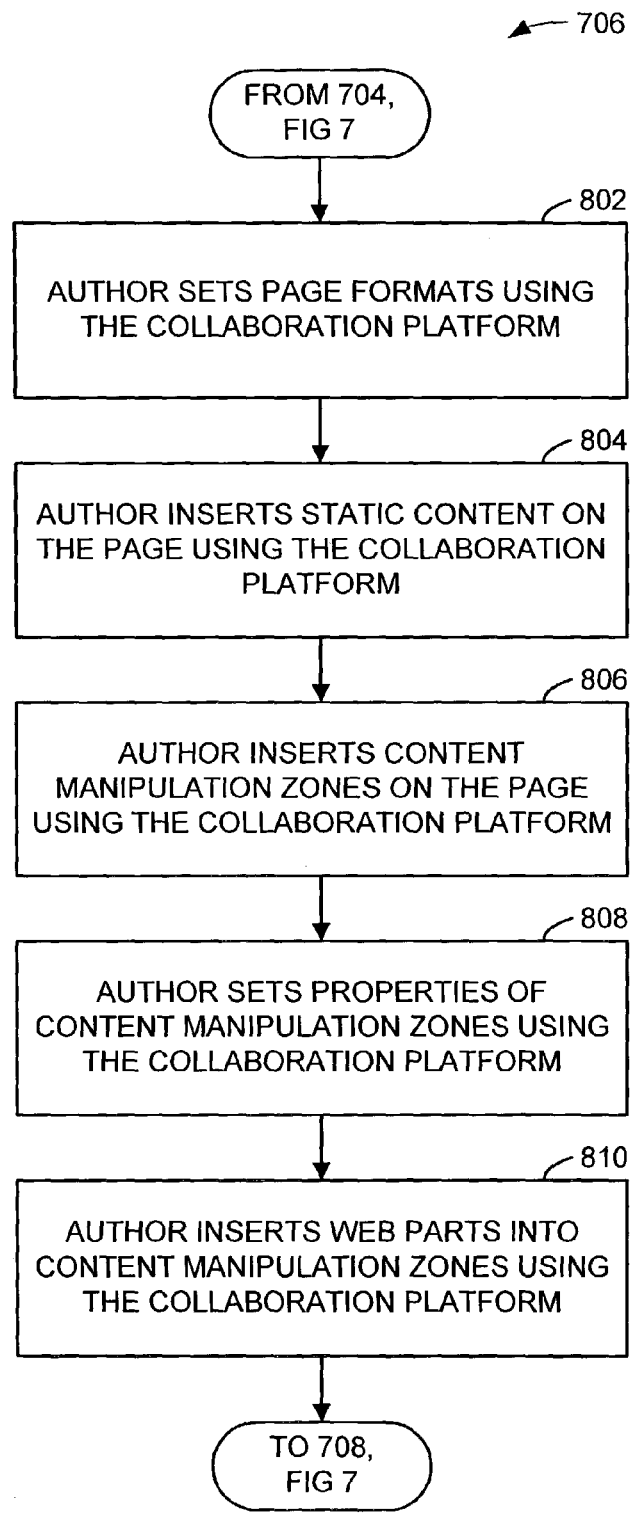
FIG. 8 is a logic flow diagram illustrating a process for defining features of a new page according to an exemplary embodiment of the present invention.

FIG. 8 is a logic flow diagram illustrating a process for defining features of a new page according to an exemplary embodiment of the present invention. The process 706 illustrates exemplary sub-steps of routine 706 of FIG. 7. The process 706 starts with step 802, in which the author sets various formats of the page using the collaboration platform 520. These formats may include text fonts, background and foreground colors on the page, and other formatting attributes that are applicable to the page.

In step 804 of the process 706, the author inserts static content on the page using the collaboration platform 520. This static content is page content that the author does not intend for a user to manipulate. Such static content may include title bars or page headers. Referring to FIG. 16, exemplary static content 1610 is shown across the top of the page. As another example, static content 1504-1508 is illustrated in the block diagram of the exemplary page 1500 of FIG. 15. Static content will typically be viewed in any page mode (e.g., shared or personal) or editing option mode.

After step 804, the page author inserts content manipulation zones onto the page in step 806 using the collaboration platform 520. As discussed above for FIG. 7, the collaboration platform 520, or other application that is used by the page author, may provide page templates. Such templates may provide predetermined arrangements of content manipulation zones on the page. However, in contrast to existing approaches, embodiments of the present invention allow the author to position content manipulation zones based on the author's preference. Thus, for example, the author may start with a template and then modify the position of the zones in the template. Furthermore, in contrast to existing approaches, embodiments of the present invention also allow the author to insert the number of content manipulation zones that the author prefers, within the available capacity of the page. Thus, the author may add or remove zones from a template while creating a page. Size and other appearance attributes of zones may also be determined by the page author during step 806. Referring to the exemplary block diagram of FIG. 15, several zones 1520, 1540, 1560 are illustrated on the page 1500.

In step 808 of the process 706, the author sets properties of the content manipulation zones that were inserted in step 804, using the collaboration platform 520. As discussed above for FIG. 7, various properties of the zones can be set by the author. These properties may range from properties that affect how a user may interact with a zone to properties that affect how content behaves when rendered into a zone. For example, regarding user interaction with a zone, the author may set a property of the zone that prevents a user from manipulating the zone or the zone content, such as adding, removing, repositioning, and/or resizing zone content. As another example, the author may set a limit on the type of modifications that can be made to a zone, such as the type of web parts that can be added, removed, or repositioned within the zone. Regarding properties that affect how content behaves in the zone, the author may, for example, set the orientation or position that content will assume when it is added or repositioned in a zone.

The process 706 ends with step 810, in which the page author inserts web parts content into the content manipulation zones using the collaboration platform 520. In this step, the author predefines the content of zones that have been inserted onto the page in step 806. For example, referring to FIG. 16, the author may insert the web parts 1601-1605 into the zones (not shown) of the page 1600. As another example, several web parts 1522-1524, 1542-1544, and 1562-1564 are depicted as inserted in the zones 1520, 1540, 1560, respectively, of the page 1500 of FIG. 15. The web part content that is added to the zones in step 810 may be affected by properties that were set in step 808. Thus, properties affecting how the web parts content can be manipulated by a user and how the web parts content will behave in the zones may be affected by the settings performed in step 808. As discussed above, some steps of the process 706 may be performed alternatively using a web page authoring program or a text editor program. It should be appreciated that, in contrast to existing approaches, embodiments of the present invention allow the page author to determine the locations, quantities, and other properties of content manipulation zones, web parts, and other features of a page, as discussed above. Furthermore, it should also be appreciated that embodiments of the present invention allow the page author to graphically create a page with control content without having to draft the underlying page code, as discussed above.

It should be understood that, in accordance with exemplary embodiments of the present invention, actual content may not be added to a page during steps of the process 706. Instead, the content that the author intends to be rendered when the page is requested by a user may be represented by coding (e.g., HTML) in the page. This coding can refer to content that is stored at other sources, such as in various tables of the content database 310. For example, in step 802, the author may actually add coding to the page, for example using the collaboration platform 520, that refers to content that is stored in the list database 312. As discussed above for FIG. 4, the content will be referenced by an ID, such as a document ID, and the content will be rendered to the user's web browser 270-272 when a page with the corresponding ID is requested.

The foregoing feature of separating content and page code is particularly applicable to web parts content, in accordance with exemplary embodiments of the present invention. For example, this feature allows dynamic updating of web parts from multiple sources without the need to update every page that includes the web parts. Thus, in step 810, coding (e.g., HTML tags) may be added to the zone which causes web parts content stored in the web parts table 316 and/or, in some cases, the personalization table 318 to be rendered to the zone region of the page when it is rendered to a user's browser 270-272. As discussed above, the web parts can be referenced by web part IDs that are coded to the page and related to the page or document ID. Furthermore, the zones can be referenced by zone IDs to indicate which zone a web part should be rendered to on the page.

Typically, a web part includes properties that control how it renders data from within a zone, such as for the weather and stock information examples discussed above. Moreover, a web part may include several sub-web parts that implement data from different sources.

In contrast to the foregoing features, the content manipulation zones are typically coded as objects directly to the page. Therefore the zones are typically stored with the page in, for example, the documents table 314 and/or the list table 312. As discussed above, the coding for the zones includes various formats and properties of the zones.

Figure 9:
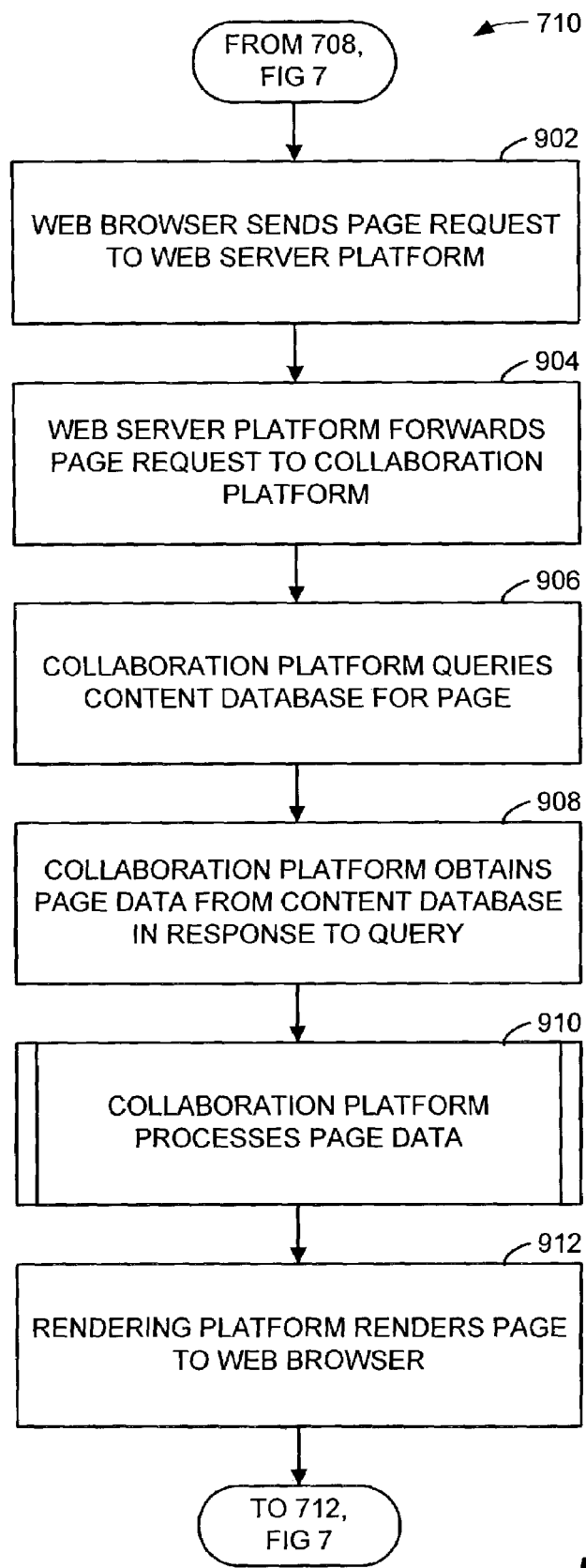
FIG. 9 is a logic flow diagram illustrating a process for requesting a page according to an exemplary embodiment of the present invention.

FIG. 9 is a logic flow diagram illustrating a process for requesting a page according to an exemplary embodiment of the present invention. The process 710 illustrates exemplary sub-steps of routine 710 of FIG. 7. The process 710 begins with step 902, in which one or more web browsers 270-272 send a request for a page to a web server platform 500. In accordance with exemplary embodiments of the present invention, the requested page includes content manipulation zones that may include web parts content, as discussed above for FIG. 8. The page may be requested in the form of an HTTP request, for example, by submitting a uniform resource locator (URL) to the web browser 270-272.

In step 904, the web server platform 500 forwards the page request from step 902 to the collaboration platform 520. The web server platform 500 may initially process the page request to determine whether to route it to the collaboration platform 520 or another component of the web server 260. Typically, a request for a page that includes content manipulation zones and/or web parts content will be routed to the collaboration platform 520, which executes code to process that type of page request. For example, if the web server platform 500 is implemented by Microsoft® Internet Information Server (IIS) and the collaboration platform 520 is implemented by Microsoft® SharePoint™ Team Services (STS), the request may be handled in the following manner during step 904. First, the IIS web server platform 500 receives the request and determines where (e.g., which server) the requested data is located. If the data is located on a server that has been configured for the use of content manipulation zones, the IIS web server 500 determines that the request needs to be handled by the STS collaboration platform 520. The IIS web server platform 500 forwards the page request to the STS collaboration platform 520, where the request is further processed. The IIS web server platform may accomplish this by initiating an Internet server application program interface (ISAPI) filter that starts a dynamic link library (DLL) for the STS collaboration platform 520 (e.g., "stsfilter.dll").

Following step 904, in step 906, the collaboration platform 520 queries the content database 310 in response to the page request. As discussed above for FIG. 3, the content database 310 includes tables that store data for pages and web parts. Continuing with the foregoing example of the STS collaboration platform 520, the STS collaboration DLL can generate the query to the content database 310. Then, in step 908, the collaboration platform 520 obtains the page data from the content database 310 in response to the query. As discussed above, the data for the page may be obtained from the documents table 314 and the list table 312, and data for the web parts content of the page may be obtained from the web parts table 316 and the personalization table 318.

In routine 910, the collaboration platform 520 processes the page data (i.e., page and web parts data) before it is rendered to the user's browser 270-272. In routine 910 the collaboration platform 520 may perform checks on the data to ensure that system security and integrity is maintained, as will be discussed with respect to the exemplary sub-steps of FIG. 10. The process 710 ends with step 912, in which the rendering platform renders the page data to the web browser 270-272 to form the requested page with content manipulation zones and web parts content. As discussed above, the rendering platform 510 may be implemented by the Microsoft® ASP.NET rendering platform in some embodiments of the present invention. In such embodiments, the ASP rendering platform 510 may be initiated by the STS collaboration platform 520 to transmit HTML code representing the requested page and page content to the web browser 270-272.

Figure 10:
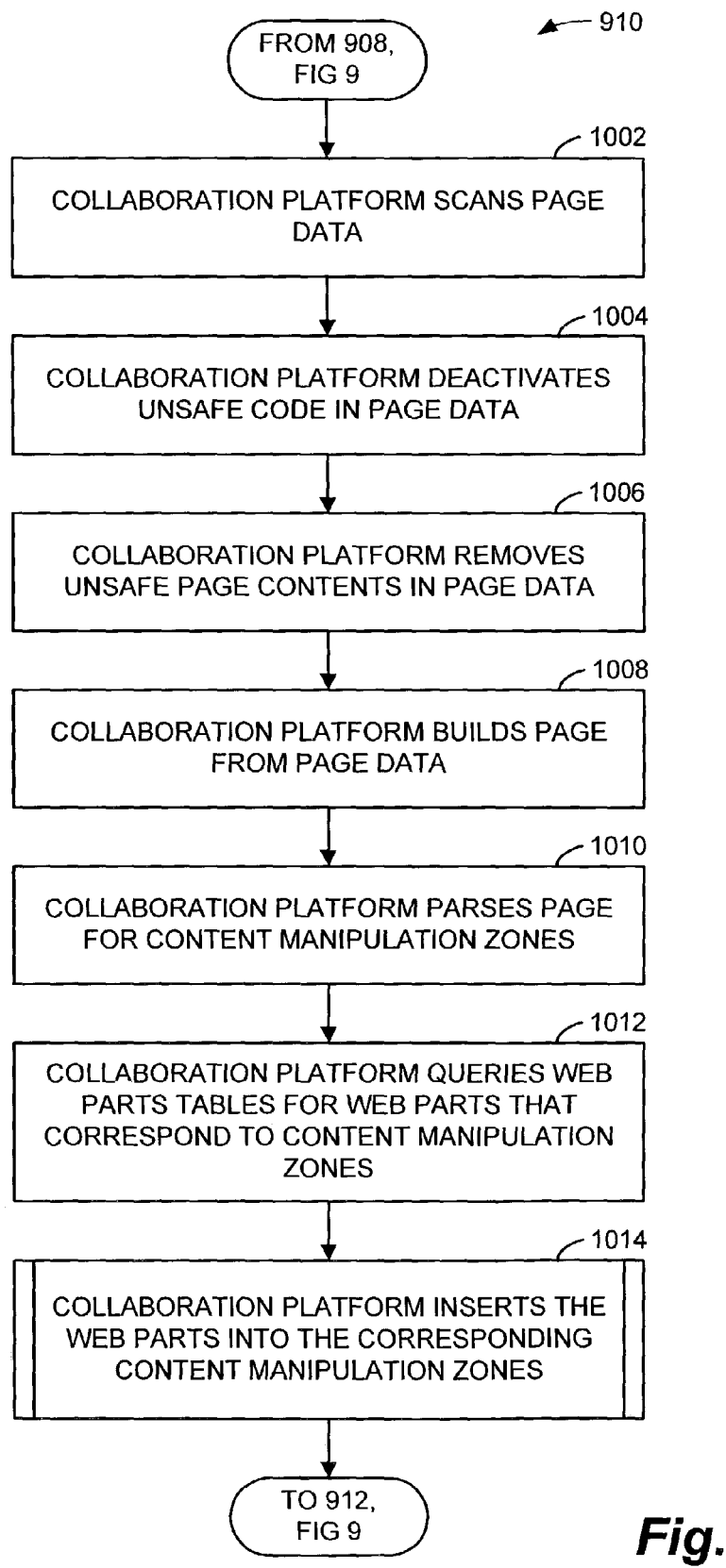
FIG. 10 is a logic flow diagram illustrating a process for processing page data according to an exemplary embodiment of the present invention.

FIG. 10 is a logic flow diagram illustrating a process for processing page data according to an exemplary embodiment of the present invention. The process 910 illustrates exemplary sub-steps of routine 910 of FIG. 9. This exemplary process 910 starts at step 1002 in which the collaboration platform 520 scans the page data. Continuing with the example discussed for FIG. 9, where an STS collaboration platform 520 is implemented, the STS DLL passes the page data on to a so called "safe mode handler" in this step 1002, which scans the page data. The safe mode handler is a routine of managed code that is executed on the STS collaboration platform 520.

Following step 1002, in step 1004, the collaboration platform 520 deactivates any code embedded in the page data (e.g., by changing it to a comment or deleting it) that is known to be unsafe or problematic to the security and integrity of the operating system and/or the network environment 100. For example, the collaboration platform may deactivate code that is known to cause execution errors or infinite loops that might degrade or halt the operation of the system and/or network 100. Then, in step 1006, the collaboration platform 520 removes page contents (e.g., web parts) from the page data that is known to be unsafe or problematic to the security and integrity of the operating system and/or the network environment 100.

The determination of unsafe code and page content in steps 1004 and 1006 may be based on a listing or library of known unsafe code and content that can be maintained by a system administrator. Thus, the system administrator may control which code and content is allowed to be used in the system and/or network 100.

In some exemplary embodiments of the present invention, steps 1004, 1006 may be replaced by a determination step (not shown) in which the collaboration platform 520 determines if any unsafe code or unsafe page content is contained in the page data. If the collaboration platform 520 determines that unsafe code or unsafe content is present, the collaboration platform 520 may halt the processing of the page data to prevent the unsafe matter from being rendered to the web browser 270-272. Furthermore, the collaboration platform 520 may also cause an error message or other indicator to be rendered to the web browser 270-272 to advise a user that unsafe code or content was detected. Otherwise, if unsafe code or unsafe content is not detected by the collaboration platform, the process 910 can continue to step 1008, as discussed below. As discussed above, the determination of unsafe code or unsafe page content in the foregoing determination step may be based on a listing or library of known unsafe code and content that can be maintained by a system administrator.

After step 1006, the collaboration platform 520 builds the requested page from the remaining safe data in step 1008. In exemplary embodiments that implement an ASP rendering platform 510, the collaboration platform 520 can build the page in an ASP format. Then, in step 1010, the collaboration platform 520 parses through the page to locate content manipulation zones. With regard to the foregoing steps 1008, 1010, it is noted that these steps may be implemented substantially concurrent to each other in accordance with exemplary embodiments of the present invention. For example the collaboration platform 520 may parse through the page to locate content manipulation zones, as instep 1010, while also parsing through other page data and content to build the page, as in step 1008.

When a content manipulation zone is located, the process 910 continues with step 1012, in which the collaboration platform 520 queries the web parts table 316 and/or the personalization table 318 for web parts that correspond to the content manipulation zone. For example, as discussed above, the page may have a document ID, and each content manipulation zone within the page may have a zone ID. Web parts that correspond to the located zone may therefore be determined by querying the web parts table 316 for web parts that are assigned the corresponding document ID and zone ID. The personalization table 318 may also be queried for corresponding web parts if the user is interacting in personal mode, as discussed above for FIG. 7.

When corresponding web parts are located by the query in step 1012, the process 910 proceeds to routine 1014 in which the collaboration platform 520 inserts the web parts into the corresponding content manipulation zones. This routine 1014 may also be described as populating the content manipulation zone with web parts, and may include the exemplary sub-steps described below for FIG. 11. As discussed above for FIG. 8, the web part data is typically stored in a separate location (such as the web parts table 316) from the page and is referenced by code in the page to support dynamic population of the zones with web parts. As with any of the steps discussed with regard to the exemplary embodiments of the present invention, steps 1010 through 1014 may repeat. For example, steps 1010 through 1014 may repeat in the process 910 until all content manipulation zones on the page have been parsed. Continuing with the above example, in which the STS collaboration platform 520 is implemented, the safe mode handler may execute steps 1004 through 1014 in accordance with exemplary embodiments of the present invention.

Figure 11:
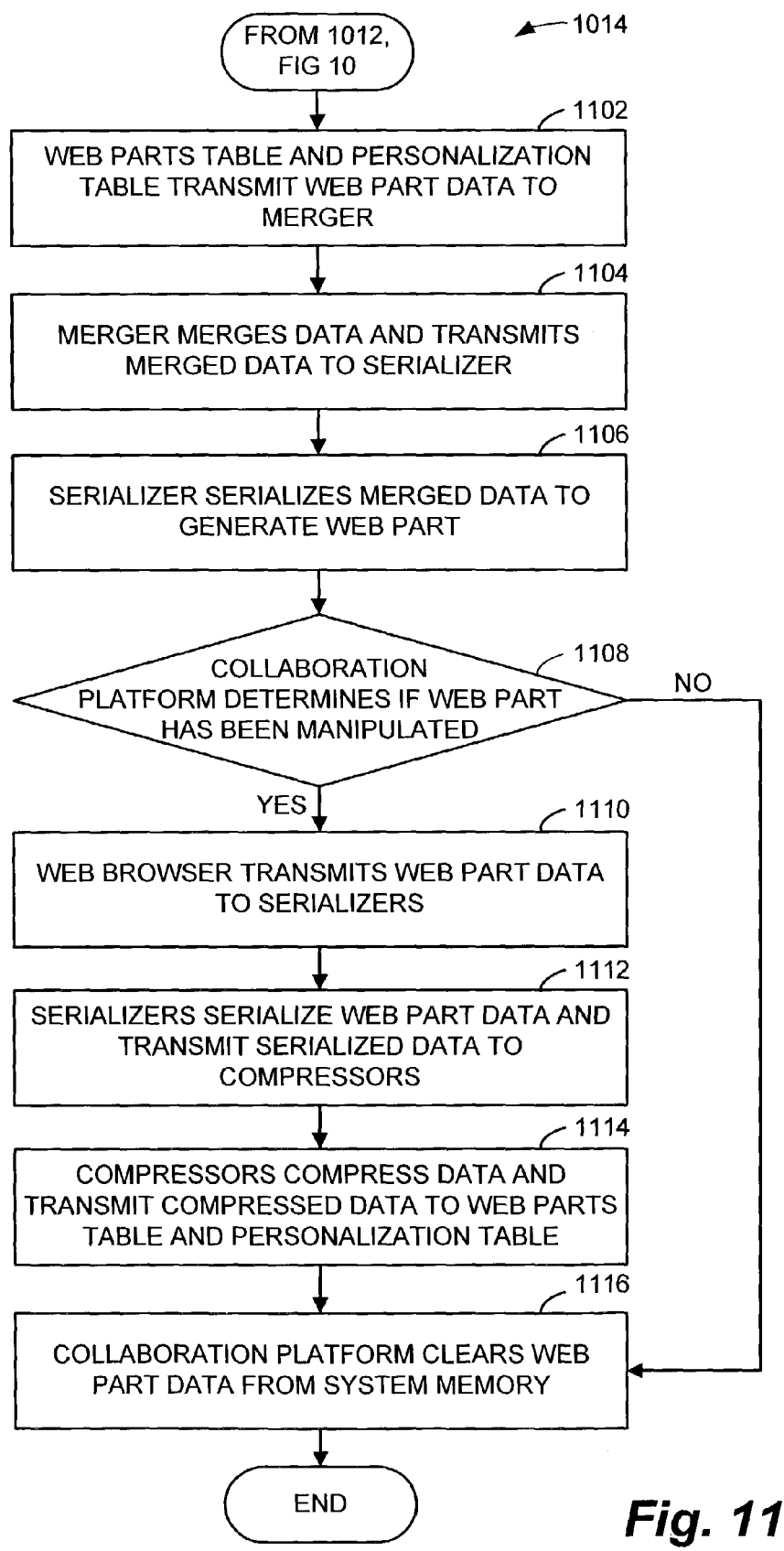
FIG. 11 is a logic flow diagram illustrating a process for managing page control content according to an exemplary embodiment of the present invention.

FIG. 11 is a logic flow diagram illustrating a process for managing page control content according to an exemplary embodiment of the present invention. The exemplary process 1014 can represent exemplary sub-steps of routine 1014 for FIG. 10. The exemplary process 1014 begins with step 1102 in which web part data (or properties) is transmitted from the web parts table 316 and/or the personalization table 318 to the merger 352. As discussed above, the web part data includes the state of the web part and any additional data that is needed to render the web part to a page. As also discussed above, data is obtained from the tables 316, 318 depending on the condition of the web part. For example, if the web part is global (i.e., not manipulated) or customized (i.e., properties manipulated for shared access), the web part data may be obtained from the web parts table 316. However, if the web part is personal (i.e., inserted only for personal access), the web part data may be obtained from the personalization table. Furthermore, if the web part is personalized (i.e., properties manipulated for personal access), the web part data may be obtained from the web parts table 316 and the personalization table 318.

Following step 1102, the exemplary process 1014 proceeds to step 1104, in which the merger 352 merges the web part data received from the web parts table 316 and/or the personalization table 318. The merger 352 transmits the merged data to the serializer 354. In its most basic function, the merger 352 may simply arrange the web part data from the web parts table 316 and/or the personalization table 318 into a common group of data or code. However, the merger 352 may further merge the data by organizing it based on the web part properties to which it is related. For example, web part data related to the appearance of the web part from each of the tables 316, 318 may be organized by the merger 352 and then transmitted to the serializer 354.

In step 1106, the serializer 354 serializes the merged data to generate a web part. As discussed above, the serializing of the data can be performed in the same or similar manner as implemented by a Microsoft®.NET XML Serializer. The serialized data from the serializer 354 provides a web part that can be inserted into a page, for example within a content manipulation zone. The steps 1102-1106 may represent a deserialization process that can be performed by the exemplary architecture 350 described above for FIG. 3B. A web part is populated into a zone of a page by this process.

Following step 1106, the collaboration platform 520 determines if the web part has been manipulated after being inserted on the page in decision step 1108. The web part may be manipulated to modify various properties of it, such as the appearance or the type of data displayed by the web part, as discussed in more detail above with respect to FIG. 6. The collaboration platform 520 may determine if the web part has been manipulated based on the status of an indicator that is included in the properties of the web part. If the collaboration platform 520 determines that the web part has been manipulated, the exemplary process 1014 proceeds along the "yes" branch to step 1110.

In step 1110, the web browser 270-272 transmits the web part data to serializers 382-383. The web browser 270-272 may transmit some or all of the web part data. For example, the web browser 270-272 may transmit the web part data that has been manipulated or the web browser 270-272 may manipulate all of the data related to the manipulated web part. The web part data may be transmitted to the serializers 382-383 depending on whether the web part has been customized, personalized, or manipulated as a personal web part. For example, if the web part has been customized, the web part data may be transmitted to the serializer 382 to be subsequently transmitted to the web parts table 316. If the web parts has been manipulated as a personal web part, the web part data may be transmitted to the serializer 383 to be subsequently transmitted to the personalization table 318.

Following step 1110, the serializers 382-383 serialize the web part data and transmit the serialized data to the compressors 384, 385, respectively, in step 1112. As discussed above, the serializing of the data can be performed in the same or similar manner as implemented by a Microsoft®.NET XML Serializer. The serializer can serialize the data to place it in a format for storage in the tables 316, 318. In step 1114, the compressors 384, 385 compress the data and transmit it to the web parts table 316 and/or the personalization table 318. As discussed above, the compressors 384, 385 may compress the data in the same or similar manner as implemented by a Microsoft® XML Writer. Thus, the compressors 384, 385 may reduce the size of the web part data by removing verbose code in order to facilitate efficient storage of the web part data in the tables 316, 318.

After step 1110, the collaboration platform 520 clears the web part data from memory, such as the system memory 122 in step 1116. This step 1116 facilitates the efficient use of the system memory for 122 for subsequent processes, such as the deserialization of other web parts according to steps 1102-1106. The exemplary process 1014 also proceeds directly to step 1116 along the "no" branch if the collaboration platform 520 determines that the web part has not been manipulated in decision step 1108. The steps 1110-1114 may represent a serialization process that can be performed by the exemplary architecture 380 described above for FIG. 3C. Furthermore, the steps 1108-1116 may be represent as a "tear down" process for the release of memory following the insertion of a web part on a page.

FIG. 12 is a diagram illustrating page editing modes in accordance with the exemplary embodiment of the present invention discussed for routine 716 of FIG. 7. As discussed above for FIG. 7, a user may select a page editing mode to manipulate the content of a page. As depicted, several main editing mode options may be available. In an exemplary embodiment of the invention, the "design mode" is a default editing mode. Under the design mode, there may be several editing options. For example, there may be an "add web parts" option, a "modify properties" option, and a "design page" option. As depicted, the add web parts option may have several editing sub-options, such as a "browse," "import," or "search" option.

Under the browse sub-option of the add web parts option of the design mode, for example, a user can browse through catalogs of web parts from various sources and select from thumbnail views of the web parts that can be "dragged and dropped" into a content manipulation zone of the page. Under the modify properties option of the design mode, for example, a user can modify properties of the web parts such as the particular data that the web parts display, as discussed in the examples for FIGS. 3 and 7. Under the design page option of the design mode, a user may be able to design certain aspects of the page. As discussed above for FIG. 8, a user's ability to edit the page under the design mode may be limited based on the properties of the content manipulation zones set by the page author.

Figure 17:
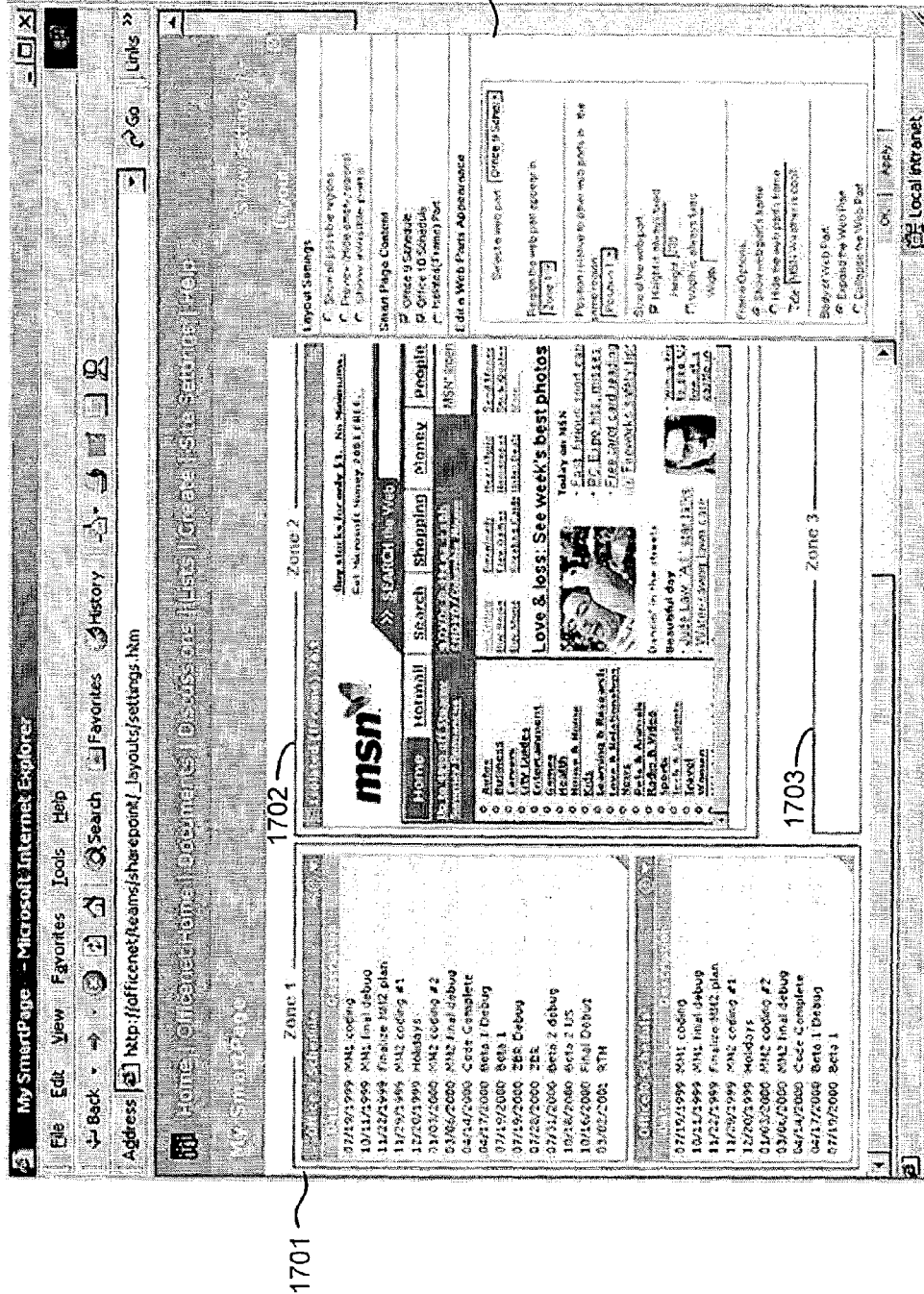
FIG. 17 is a web browser screen view of a page with representative control content in an editing mode according to an exemplary embodiment of the present invention.

In accordance with exemplary embodiments of the present invention, visual cues may be provided to the user depending on the editing modes and options that are selected. For example, when the user selects the design mode, the appearance of the page may be modified to facilitate manipulation of page content by the user. Hidden title bars may appear for web parts. Borders may appear to indicate zone regions, and the title of the zones may also appear. There may also be changes to the zone coding on the page, for example, padding of the HTML code may occur to facilitate editing within the zones. Other visual cues and changes may be provided to facilitate the user in manipulating content on the page while in design mode or other editing mode options. A comparison of the exemplary page 1600 in FIG. 16 to the page 1700 in FIG. 17 illustrates several of the visual cue changes discussed above that may occur when a user selects a page editing mode. For example, the zone border and titles cues are shown in FIG. 17 for zones 1701-1703. However, in contrast to existing approaches, it should be appreciated that the user is able to manipulate page content in real-time while accessing the page.

FIG. 13 is a diagram illustrating page editing options in accordance with the exemplary embodiment of the present invention discussed for routine 718 of FIG. 7. As depicted, a user may have several options for editing a page using, for example, a web browser 270-272. For example, a user can insert a web part into a content manipulation zone or remove a web part from a zone. A user may also have the option to reposition a web part within a zone or move a web part from one zone to another zone. Additionally, the user may have an option to modify the size and/or shape of a web part. Furthermore, as discussed above, a user may have the option to modify other properties of a web part, such as the type of data the web part displays.

Figure 14:
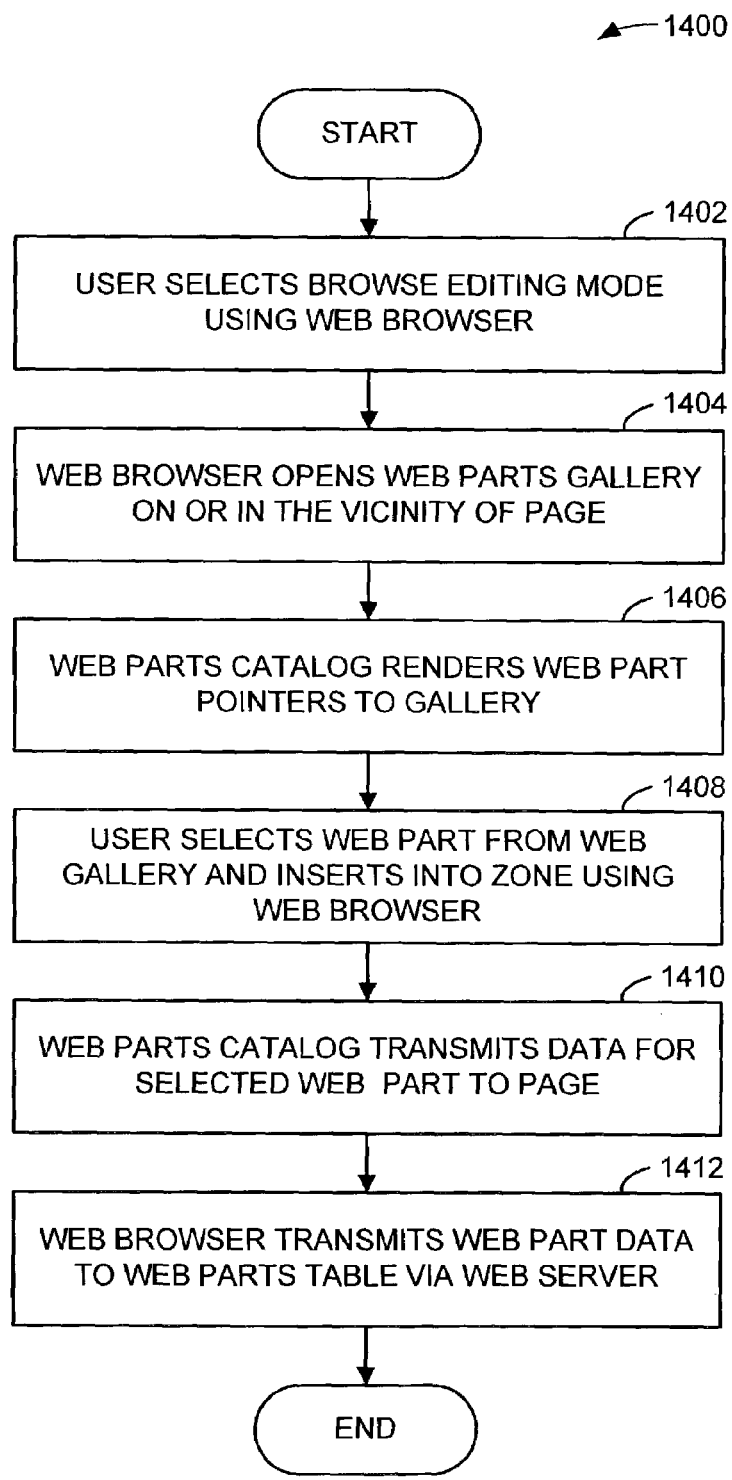
FIG. 14 is a logic flow diagram illustrating a process for providing page control content according to an exemplary embodiment of the present invention.

FIG. 14 is a logic flow diagram illustrating a process for providing page control content according to an exemplary embodiment of the present invention. The exemplary process 1400 may represent steps that can be taken to manipulate page control content in accordance with the page editing modes and the page editing options described for FIGS. 12 and 13 above, respectively. The exemplary process 1400 starts with step 1402, in which a user selects a browse editing mode using a web browser 270-272. As discussed above for FIG. 12, a user can manipulate a page by adding (or removing) control content in the browse mode.

After step 1402, the web browser 270-272 opens a web parts gallery on or in the vicinity of the page in step 1404. The web parts gallery may be opened on the page, for example, within a portion of the page, or it may be opened in the vicinity of the page, for example, in a window that can be accessed while accessing the page. The web parts gallery is opened in response to the user selecting the browse mode in step 1402. A web parts gallery can be a toolbox or other form of user interface (UI) that can present one or more catalogs of web parts that can be inserted into a page. In contrast to typical toolboxes, the web parts gallery can be dynamically populated with web parts (or other controls) that are obtained from multiple sources (e.g., catalogs) that may be local or remote to the web browser 270-272. For example, the web part gallery may include web parts from an application program that is local to the web browser 270-272. As another example, the web part gallery may include web parts from the web server 260 or from another remote web server (not depicted). In comparison, a typical toolbox is limited to containing content that is locally coded in the application program that provides the toolbox. An exemplary representation of a web parts gallery is depicted by the web parts gallery 1808 in FIG. 18 and the web parts gallery 1908 in FIG. 19.

Following step 1404, in step 1406, a web parts catalog renders web part pointers to the web parts gallery that was opened in step 1404. In this regard, a web part pointer can include a reference in the web parts gallery to a web part stored in a memory or database, which may be remote to the web parts gallery. The reference may be, for example, in the form of computer code, data, or an address referring to a memory or database location. As discussed above, the web parts gallery can be populated with web parts from one or more catalogs of web parts stored locally or remotely to the web browser 270-272. A catalog may include as few as one or as many as (but not limited to) hundreds of web parts. The actual web parts can be rendered to the web parts gallery for browsing by the user. Alternatively, however, pointers for the web parts can be rendered to the web parts gallery instead of the actual web parts in order to conserve memory and provide faster performance by the web parts gallery. As depicted, for example, in FIG. 19, the web parts gallery 1908 can include pointers in the form of thumbnail images 1910-1919 that represent the web parts. In some exemplary embodiments of the invention, the web parts may be displayed in groups, for example, of several web parts to facilitate the rendering of the pointer images 1910-1919 to a page 1900. The user can browse through the groups of web parts 1910-1919 in the gallery 1908 to find a desired web part.

Figure 18:
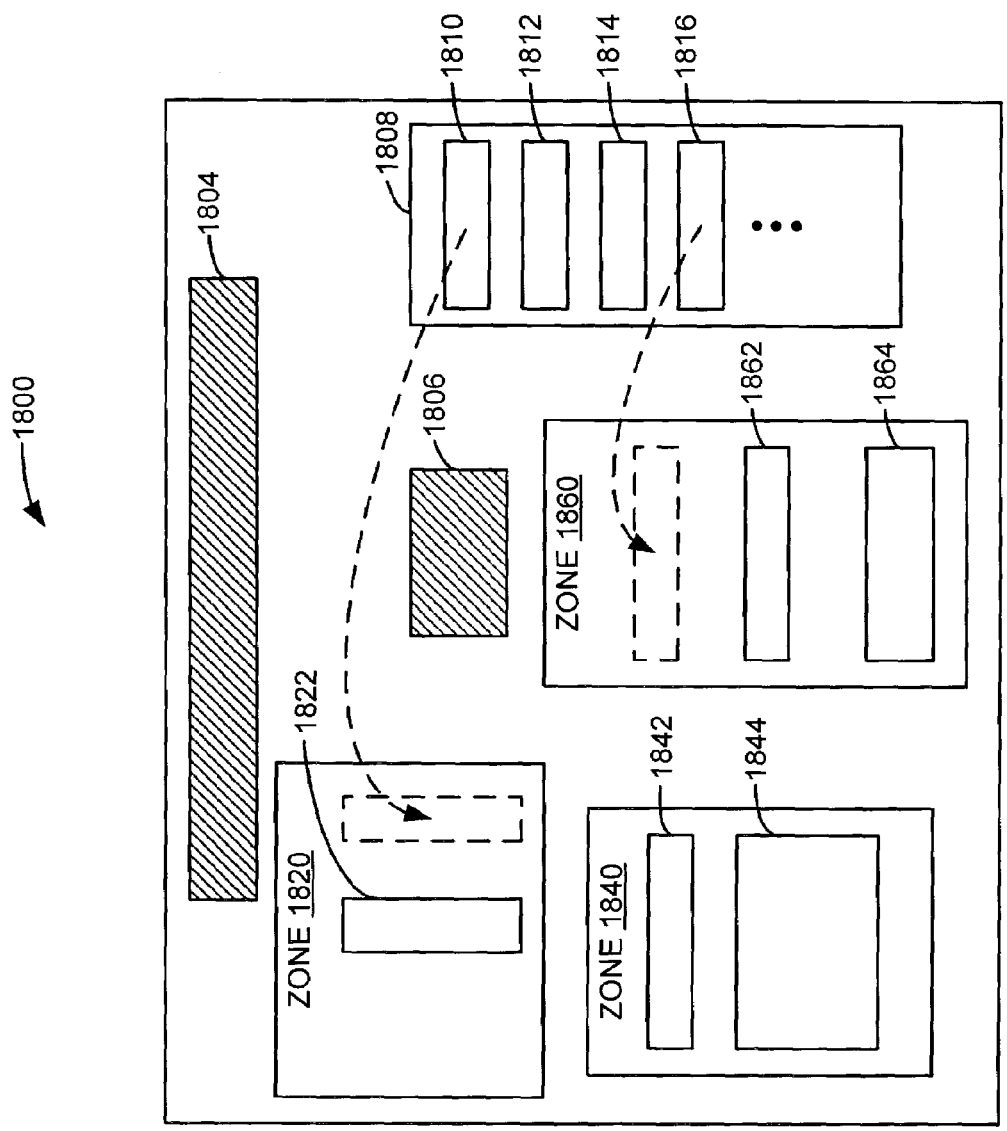
FIG. 18 is a block diagram illustrating a page with representative control content according to an alternate exemplary embodiment of the present invention.

In step 1408, a page user selects a web part from the web part gallery and inserts the selected web part into a content manipulation zone on a page using a web browser 270-272. Referring to FIG. 18, an exemplary representation of the action for step 1408 is depicted. For example, a web part 1810 (i.e., a thumbnail image/pointer for the web part) is selected and inserted into a zone 1820 on the page 1800. The step 1408 can be performed by a "drag-and-drop" operation using a mouse cursor in a web browser environment 270-272. A user can use the mouse to select the web part 1810, drag it over to the zone 1820, and drop it into the zone 1820 to insert in on the page. Visual cues, such as those described above for FIG. 12, may be provided as part of step 1408. For example, the web part 1810 may change from its default appearance when it is selected, and the shape of the cursor may change during the movement of the web part to the zone 1820. As another example, the appearance of the zone may change when the web part 1810 is dragged within it, and a bold line cue (e.g., an "I-bar") may appear in the zone to indicate an available position in the zone 1820 in which to place the web part 1810.

Following step 1408, the web parts catalog (not depicted) that is the source of the selected web part 1810 transmits the data (or properties) for the web part 1810 to the page 1800 in step 1410. After the web part 1810 is inserted into the zone 1820, the web browser creates a record for the web part 1810 that includes the properties (e.g., the state), a page or document ID, a web part ID, and a zone ID (all of which were discussed above for FIG. 4) relative to the web part 1810. This record typically has the form of the table records that are stored, for example, in the web parts table 316. The record of the web part data may include hidden fields on the page.

In step 1412, the web browser 270-272 transmits the web part data recorded in step 1410 to the database server 250, for example, to the web parts table 316. Typically, the data is transmitted to the web parts table 316 and/or other tables on the database server 250 via the web server 260, for example, in the manner discussed above for the transfer of data with respect to FIGS. 2A-2B. The web server 250, for example by function of the collaboration platform 520, may copy data for the web part from the web part catalog in response to the record received from the web browser 270-272. Once the web part data is added to the web parts table 316 (and/or other tables on the database server 250), the user can manipulate the web part 1810 to modify shared and/or personal properties as discussed above for FIG. 6.

Figure 15:
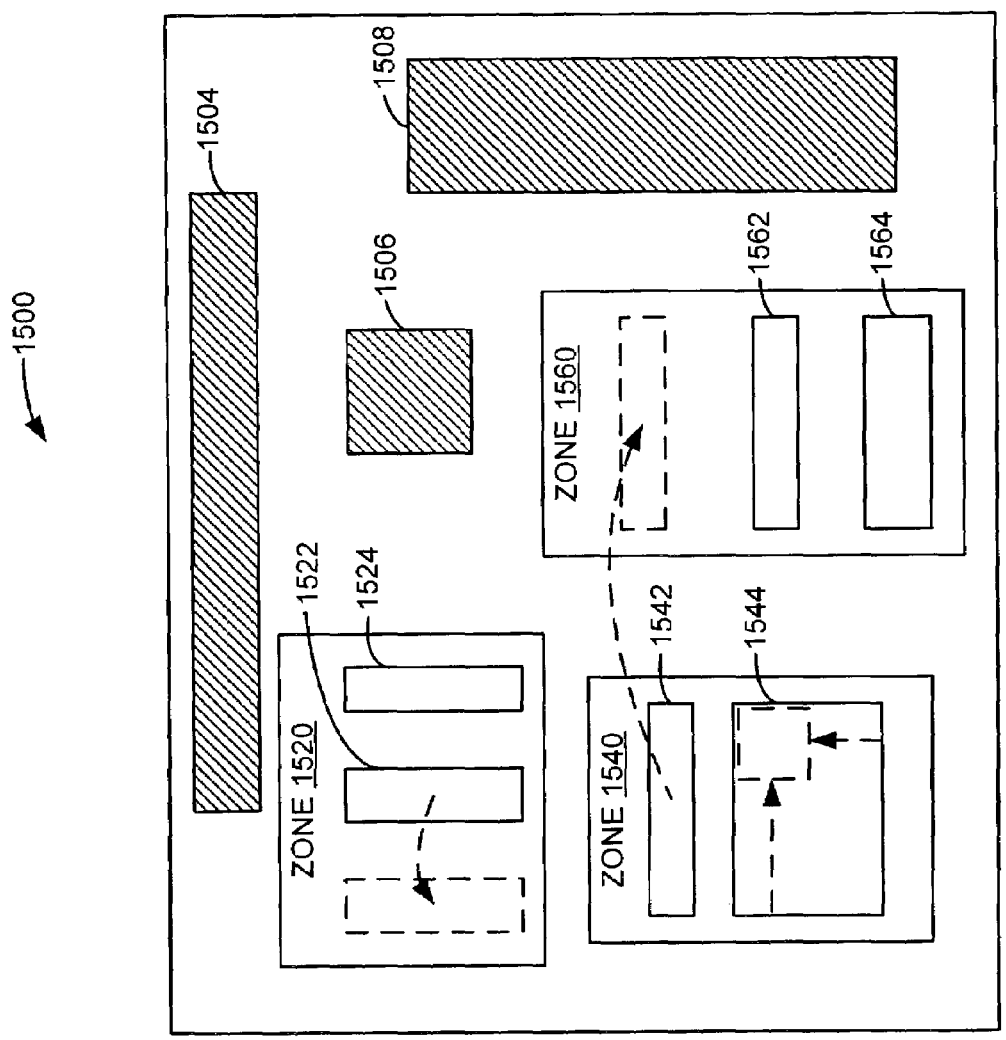
FIG. 15 is a block diagram illustrating a page with representative control content according to an exemplary embodiment of the present invention.

Referring to FIG. 15, a block diagram is shown that illustrates a page with representative content according to an exemplary embodiment of the present invention. The exemplary page 1500 includes several static content objects 1504-1508. These static content objects 1504-1508 may be added to the page by a page author, as discussed for FIG. 8. Furthermore, the static content 1504-1508 may include title blocks, headers, or other types of content that the page author intends to be unchangeable and accessible by all users of the page.

The exemplary page 1500 also includes several content manipulation zones 1520, 1540, 1560. These zones 1520, 1540, 1560 may also be added to the page by a page author, as discussed for FIGS. 6 and 8. As depicted, each content manipulation zone 1520, 1540, 1560 may include web parts content. For example, zone 1520 may include web parts 1522, 1524, zone 1540 may include web parts 1542, 1544, and zone 1560 may include web parts 1562, 1564, as shown.

As discussed above for FIG. 13, a user may add or remove web parts 1522, 1524, 1542, 1544, 1562, 1564 from the zones 1520, 1540, 1560 depending on the page and zone properties set by the page author. Thus, in some exemplary embodiments, the properties of one or more of the zones 1520, 1540, 1560 may be set by the page author to prevent a user from adding or removing the web parts 1522, 1524, 1542, 1544, 1562, 1564 from them.

As also discussed with respect to FIG. 13, a user may be able to reposition a web part within a zone. An example of this editing option is depicted in zone 1520. The web part 1522 can be repositioned by a user from a middle position of the zone 1520 to a left position of the zone 1520. In this regard, a page author may configure a zone to have predetermined positions where a user can position web parts.

FIG. 15 also illustrates an example of the option of a user to move a web part 1542 from one zone 1540 to another zone 1560, as discussed for FIG. 13. In accordance with exemplary embodiments of the invention, the web part 1542 can be moved from its position in the first zone 1540 to an available position in the second zone 1560. As discussed above, the ability of the user to move a web part can be dependent on the configuration of the zone properties by the page author.

An example of a user option to modify the shape and/or size of a web part 1544 is also illustrated in FIG. 15. A web part 1544 can be modified, for example, to a smaller (or larger) size. Furthermore, a web part 1544 can be modified, for example, from a first shape (e.g., substantially rectangular) to a second shape (e.g., substantially square).

To aid the user in positioning a web part in a zone, visual cues may be generated in accordance with exemplary embodiments of the invention. For example, when the user positions the mouse cursor within a zone, the zone (e.g., the border of the zone) may change from a default color (e.g., gray) to an active indication color (e.g., blue) to cue the user that content may be manipulated within that zone. As another example, the cursor may change shapes (e.g., from a single to a four-headed arrow) when the user places it over a web part that can be moved. The cursor may also change shapes (e.g., from an arrow to a circled slash or "no-feedback" symbol) to indicate that the user is moving a web part in an area of the page where the web part can not be positioned (e.g., outside of a zone). Furthermore, as a user moves a web part toward a position within a zone, a bold line visual cue (e.g., an "I-bar") may appear in the zone to indicate a nearby available position in which to place the web part. The positioning of a web part in the zone using the mouse cursor can be referred to as a "drag-and-drop" operation.

As discussed above, FIG. 16 illustrates a web browser screen view of a page 1600 with representative control content in a viewing mode according to an exemplary embodiment of the present invention. The exemplary page 1600 includes several exemplary web parts 1601-1605 that are content in zones on the page. The page 1600 also includes exemplary static content 1610.

As also discussed above, FIG. 17 illustrates a web browser screen view of a page 1700 with representative control content in an editing mode according to an exemplary embodiment of the present invention. The page 1700 illustrates some of the visual cues and changes that may occur to the page 1600 of FIG. 16 when it is placed in design mode. Thus, several zones 1701-1703 are shown, including the zone titles and borders. The page also includes an additional object 1710 that provides layout settings for the web parts in the zones 1701-1703. Thus, this page 1700 may be an example of the page appearance when the user has selected the modify properties option under the design mode, as discussed for FIG. 12. It is noted that, although the page 1700 is modified with visual cues, it is still the same page (e.g., the page 1600) that the user initially accesses when it is requested.

FIG. 18 is a block diagram illustrating a page with representative control content according to an alternate exemplary embodiment of the present invention. The exemplary page is similar to the page 1500 discussed for FIG. 15. The page 1800 includes static content 1804, 1806, which may include title blocks, headers, or other types of content that a page author intends to be unchangeable and accessible by all users of the page. The page also includes several content manipulation zones 1820, 1840, 1860, whose features were discussed above with respect to FIG. 6. The content manipulation zones can include control content (e.g., web parts). For example, zone 1820 contains web part 1822, zone 1840 contains web parts 1842, 1844, and zone 1860 contains web parts 1862, 1864.

In contrast to the exemplary 1500 of FIG. 15, the exemplary page 1800 also includes a web parts gallery 1808, which was discussed above for FIG. 14. The web parts gallery 1808 includes web parts (e.g., web part thumbnail images/pointers) 1810-1816, which may be obtained from sources (e.g., catalogs) that are local or remote to the page 1800. Although not depicted in FIG. 18, the web parts gallery 1808 may also be opened in the vicinity of the page 1800, for example, in a window (not depicted) that can be accessed while accessing the page 1800. As depicted in FIG. 18, the web parts 1810-1816 can be "dragged-and-dropped" from the web parts gallery 1808 into one of the zones 1820, 1840, 1860. For example, the web part 1810 is depicted being dragged from the web parts gallery 1808 and dropped in the zone 1820. Similarly, the web part 1816 is depicted being dragged from the web parts gallery 1808 to the zone 1860. As discussed above for FIG. 8, properties of the zones can be set that affect the behavior of web parts that are placed in the zones. For example, the web part 1810 assumes a vertical orientation when placed in the zone 1820 based on the orientation property set for the zone. In contrast, the web part 1816 assumes a horizontal orientation when it is inserted into the zone 1860, based on the settings for that zone 1860.

Figure 19:
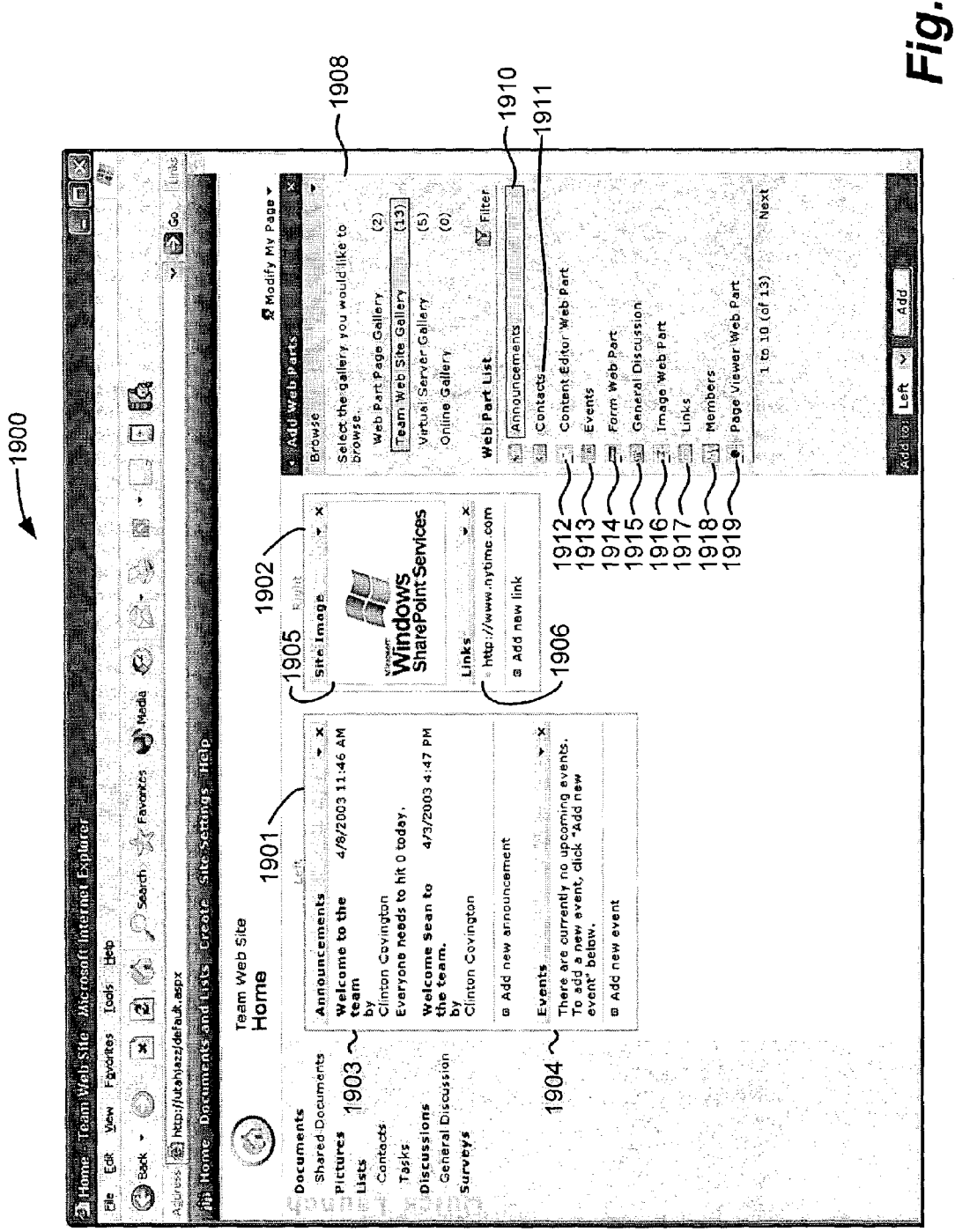
FIG. 19 is a web browser screen view of a page with representative control content in an alternate editing mode according to an alternate exemplary embodiment of the present invention.

FIG. 19 is a web browser screen view of a page with representative control content in an alternate editing mode according to an alternate exemplary embodiment of the present invention. The exemplary page may represent the appearance of a page when the user is accessing it in the browse mode, which was discussed above for FIG. 12. The exemplary page 1900 includes zones 1901, 1902, which contain web parts 1903-1904 and 1905-1906, respectively. The exemplary page 1900 also includes a web parts gallery 1908 that is populated with web parts (e.g., web part thumbnail images/pointers) 1910-1919. As discussed above for FIGS. 14 and 18, a user can select from the web parts 1910-1919 and insert them into one of the content manipulation zones 1901-1902 on the page 1900. Although not depicted in FIG. 19, the web parts gallery 1908 may also be opened in the vicinity of the page 1900, for example, in a window (not depicted) that can be accessed while accessing the page 1900.

FIG. 20 illustrates a general outline of HTML code for a page with content manipulation zones in accordance with an exemplary embodiment of the present invention. This exemplary code outline 2000 is a basic example of code that can be created during steps 702-708 of the process 700 of FIG. 7. As discussed with respect to FIG. 7, this code may be generated using a collaboration platform 520 (such as the Microsoft® SharePoint™ Team Services platform or the Microsoft® Windows® SharePoint™ Services platform), a web page authoring program (such as the Microsoft® FrontPage® application), or a text editor (such as the Microsoft® Notepad application).

The exemplary code outline 2000 can include a page registration declaration, which is represented by the text on line 1. In the case, for example, where the web server platform 500 is implemented by an application such as the Microsoft® ASP.NET platform, the page registration declaration can serve to identify controls and DLLs that need to be generated to build the page.

The code on line 2 of the exemplary outline 2000 shows an exemplary registration to register the Microsoft® SharePoint™ Team Services platform when it is implemented as the collaboration platform 520. This registration can be used to register the STS DLL (e.g., stsfilter.dll) for implementation in processing the page, as discussed above for FIGS. 7 and 9.

The exemplary code at line 3 of the outline 2000 represents a standard HTML declaration. The code at line 4 represents the point where code for headers and titles on the page can be entered. At line 5 of the exemplary outline 2000, the code represents where HTML tags can be entered for objects on the page. The code at line 6 is exemplary of a tag for applying a zone to the page using the STS collaboration platform 520.

It should be understood that the code illustrated in FIG. 20 is merely an exemplary outline of the basic components of HTML code that can be used to create a page with content manipulation zones. However, based on the above descriptions of the exemplary embodiments of the invention, it will be apparent to one skilled in the art to expand this exemplary outline 2000 to create pages with content manipulation zones that have a variety of configurations and properties. Moreover, it should be understood with respect to the various references to code, computer code, computer-based code, etc., that such code can be implemented in many various software or programming formats, such as, but not limited to, Microsoft® Visual Basic®, Microsoft® Visual Studio®, Microsoft® Visual C#®, or Microsoft®.NET.

In conclusion, the present invention enables a user to manipulate control content contained in one or more zones of a page, such as a web page, a word processing document, a spreadsheet, a database record, etc. The present invention allows a page author to determine the locations, quantities, and other properties of zones, control content, and other page features in accordance with the author's intentions. Furthermore, the present invention allows the page author to graphically create a page with zones for control content, without the need to write underlying page code. The present invention also allows a user to manipulate many properties of the page control content, including the position of the content on the page and the data that is displayed by the content, in real-time while accessing the page.

It will be appreciated that the present invention fulfills the needs of the existing art described herein and provides the above-stated features. While there has been shown and described several exemplary embodiments of the present invention, it will be evident to those skilled in the art that various modifications and changes may be made thereto without departing from the spirit and the scope of the present invention as set forth in the appended claims and equivalences thereof.

What is claimed is:

1. A method for manipulating page control content, comprising:
   creating a page that can be accessed in a computer-based format using a collaboration platform having at least one dynamic linked library, wherein the collaboration platform provides organizational collaboration and personalized management when creating the page;
   creating at least one zone on the page that is configured to contain at least one computer-based module comprising page control content, wherein creating at least one zone on the page comprises: defining a desired quantity of zones on the page; positioning each zone at a desired position on the page; and setting a first property of a selected one of the zones that defines how the computer-based module can be manipulated within the selected zone; and
   wherein creating at least one zone on the page further comprises setting a second property of the selected zone that defines how the computer-based module behaves when it is inserted into the selected zone;
   inserting the at least one computer-based module into the zone from a user interface, wherein at least one property of the at least one computer-based module can be manipulated within the zone while accessing the page;
   scanning page data associated with the page any part of computer-based code that is problematic to operation of a processing unit;
   automatically determining what part of the computer-based code is problematic; and
   deactivating the part of the computer-based code that is problematic to create a revised computer-based code that represents the page, wherein deactivating the part of the computer-based code comprises commenting out the part of the computer-based code that is problematic while allowing use of the revised computer-based code by the processing unit.

2. The method of claim 1, wherein creating a page in a computer-based format comprises:
   generating the computer-based code that represents the page;
   setting a format of the page using the computer-based code, wherein the format affects the appearance of the page; and
   inserting a static object on the page using the computer-based code, wherein the properties of the static object do not change when users access the page.

3. The method of claim 2, wherein generating a computer-based code that represents the page comprises:
   creating a graphical layout of the page; and
   generating the computer-based code that represents the page based on the graphical layout of the page.

4. The method of claim 1, wherein setting a first property of a selected one of the zones comprises setting a property of the selected zone that prevents the computer-based module within the selected zone from being repositioned to another of the zones.

5. The method of claim 1, wherein setting a second property of the selected zone comprises setting a property of the selected zone that causes the computer-based module to assume an orientation within the selected zone.

6. The method of claim 1, wherein inserting the computer-based module into the zone comprises creating a reference to a computer-based module in the zone using a first computer-based code that represents the page, wherein the reference refers to a second computer-based code that represents the computer-based module.

7. The method of claim 1, wherein at least one property that defines the position of the computer-based module on the page can be manipulated.

8. The method of claim 1, wherein the computer-based module is configured to present data and wherein at least one property that defines a criteria for a category of the data presented by the computer-based module can be manipulated.

9. A computer system for manipulating page control content, comprising:
   a processing unit;
   a memory in communication with the processing unit;
   a listing of problematic code and content;
   a server program stored in the memory that provides server instructions to the processing unit, wherein the processing unit is responsive to the server instructions, operable for:
      creating a page;
      creating at least one zone on the page that is configured to contain at least one computer-based module comprising page control content, wherein creating at least one zone on the page comprises: defining a desired quantity of zones on the page; positioning each zone at a desired position on the page; and setting a first property of a selected one of the zones that defines how the computer-based module can be manipulated within the selected zone; and
      wherein creating at least one zone on the page further comprises setting a second property of the selected zone that defines how the computer-based module behaves when it is inserted into the selected zone;
      inserting from a user interface the computer-based module into the zone;
      storing the page in the memory; and
      retrieving the page from the memory in response to a request for the page;
   a client program stored in the memory that provides client instructions to the processing unit, wherein the processing unit is responsive to the client instructions, operable for:
      communicating the request for the page to the server program;
      scanning computer-based code that represents the page for a part of the computer-based code that is stored in the listing of problematic code and content;
      deactivating solely the part of the computer-based code and content that is problematic to create a revised computer-based code that represents the page, wherein deactivating the part of the computer-based code comprises commenting out the part of the computer-based code that is problematic while allowing use of the revised computer-based code by the processing unit;

presenting the page when it is received from the server program; and manipulating at least one property of the computer-based module while presenting the page;

a collaboration platform having at least one dynamic linked library, wherein the collaboration platform provides individual and collaborative management of the page; and a database program stored in the memory that provides database instructions to the processing unit, wherein the processing unit is responsive to the database instructions, operable for:

receiving a query from the server program for the page;

searching the memory for the page based on the query; and sending the page from the memory to the server program.

10. The computer system of claim 9, wherein the server program comprises:

a web server program stored in the memory that provides web server instructions to the processing unit, wherein the processing unit is responsive to the web server instructions, operable for:

receiving the request for the page from the client program; and analyzing the request for the page to determine how to respond to the request.

11. The computer system of claim 9, wherein the server program comprises:

a collaboration program stored in the memory that provides collaboration instructions to the processing unit, wherein the processing unit is responsive to the collaboration instructions, operable for:

generating the computer-based code that represents the page, the zone, and the computer-based module;

storing the computer-based code in the memory;

receiving the request for the page from the web server program;

sending a query to the database program for the computer-based code stored in the memory;

receiving the computer-based code from the memory via database program; and processing the computer-based code to prepare it for rendering to the client program as the page.

12. The computer system of claim 11, wherein the processing unit, responsive to the collaboration instructions, is operable for processing the computer-based code to prepare it for rendering to the client program as the page by:

scanning the computer-based code to detect the part of the computer-based code that is problematic to the operation of the processing unit; and if the part of the computer-based code that is problematic to the operation of the processing unit is detected, halting further processing of the computer based code.

13. The computer system of claim 12, wherein the processing unit, responsive to the collaboration instructions, is further operable for processing the computer-based code to prepare it for rendering to the client program as the page by:

parsing the page to locate the at least one zone created on the page;

placing the at least one computer-based module in the at least one zone located by parsing the page; and sending the page with the at least one computer-based module in the at least one zone to the rendering program.

14. The computer system of claim 11, wherein the part of the computer-based code that is problematic is problematic to the operation of the processing unit.

15. The computer system of claim 14, wherein the processing unit, responsive to the collaboration instructions, is further operable for processing the computer-based code to prepare it for rendering to the client program as the page by:

building the page based on the revised computer-based code;

parsing the page to locate the at least one zone created on the page;

placing the at least one computer-based module in the at least one zone located by parsing the page; and sending the page with the at least one computer-based module in the at least one zone to the rendering program.

16. The computer system of claim 9, wherein the server program comprises:

a rendering program stored in the memory that provides rendering instructions to the processing unit, wherein the processing unit is responsive to the rendering instructions, operable for:

receiving the page from the collaboration program; and rendering the page to the client program.

17. The computer system of claim 9, wherein the processing unit, responsive to the server instructions, is operable for storing the page in the memory by:

associating a page identification code with the page, a zone identification code with the zone, and a control identification code with the computer-based module; and storing the page and the zone as a first record referenced by the page identification in a first table within the memory.

18. The computer system of claim 17, wherein the processing unit, responsive to the server instructions, is operable for retrieving the page from the memory in response to a request for the page by retrieving the page and the zone from the memory based on the page identification in the request for the page.

19. The computer system of claim 9, wherein the processing unit, responsive to the server instructions, is operable for creating a page by generating the computer-based code that represents the page based on a computer-based graphical layout of the page.

20. A method for manipulating page control content, comprising:

accessing a page configured in a computer-based format to include at least one zone that contains at least one computer-based module that includes page control content, wherein accessing the page occurs using a collaboration platform having at least one dynamic linked library;

modifying at least one property of the computer-based module within the zone while accessing the page, wherein accessing a page configured in a computer-based format to include at least one zone comprises:

defining a desired quantity of zones on the page;

positioning each zone at a desired position on the page;

and setting a first property of a selected one of the zones that defines how the computer-based module can be manipulated within the selected zone; and setting a second property of the selected zone that defines how the computer-based module behaves when it is inserted into the selected zone;

scanning computer-based code that represents the page for a part of the computer-based code that is problematic to the operation of a processing unit;

automatically determining what part of the computer-based code is problematic; and deactivating the part of the computer-based code that is determined to be problematic to the operation of the processing unit to create a revised computer-based code that represents the page, wherein deactivating the part of the computer-based code comprises commenting out the part of the computer-based code that is problematic while allowing use of the revised computer-based code.

21. The method of claim 20, wherein accessing a page comprises: requesting the page within a computer-based environment; and examining the content of the page.

22. The method of claim 20, wherein modifying at least one property of the computer-based module comprises changing the position of the computer-based module within the zone.

23. The method of claim 20, wherein modifying at least one property of the computer-based module comprises changing the size of the computer-based module.

24. The method of claim 20, wherein modifying at least one property of the computer-based module comprises selecting a desired classification of information for the computer-based module to display on the page.

25. The method of claim 20, wherein modifying at least one property of the computer-based module comprises moving the computer-based module from a first zone to a second zone on the page.

26. A computer-readable medium implementing computer-executable instructions stored thereon for manipulating page control content, comprising: logic for generating a page;

logic for providing organizational collaboration and personalized management of the page, wherein the logic includes at least one dynamic linked library;

logic for setting a format of the page that affects the appearance of the page;

logic for inserting a static object on the page, wherein the properties of the static object do not change when the page is accessed by a user;

logic for creating at least one zone on the page that is configured to contain at least one computer-based module comprising page control content, wherein creating at least one zone on the page comprises: defining a desired quantity of zones on the page; positioning each zone at a desired position on the page;

logic for inserting from a user interface the at least one computer-based module into the zone; setting a first property of a selected one of the zones that defines how the computer-based module can be manipulated within the selected zone; and wherein creating at least one zone on the page further comprises setting a second property of the selected zone that defines how the computer-based module behaves when it is inserted into the selected zone;

logic for scanning computer-based code that represents the page for a part of the computer-based code that is problematic;

logic for determining what part of the computer-based code is problematic; and logic for deactivating the part of the computer-based code that is determined to be problematic to create a revised computer-based code that represents the page, wherein deactivating the part of the computer-based code comprises commenting out the part of the computer-based code that is problematic while allowing use of the revised computer-based code.

27. The computer-readable medium of claim 26, wherein the logic for generating a page comprises:

logic for creating a graphical layout of the page; and logic for generating a computer-based code that represents the page based on the graphical layout.

28. The computer-readable medium of claim 26, wherein the logic for creating at least one zone on the page comprises:

logic for defining a desired quantity of zones on the page;

logic for positioning each zone at a desired position on the page; and logic for setting a first property of a selected one of the zones that defines how the computer-based module can be manipulated within the selected zone.

29. The computer-readable medium of claim 28, wherein the logic for creating at least one zone on the page further comprises logic for setting a second property of the selected zone that defines how the computer-based module behaves when it is inserted into the selected zone.

30. The computer-readable medium of claim 26, further comprising: logic for accessing the page; and logic for modifying the at least one property of the computer-based module within the zone while accessing the page.

31. The computer-readable medium of claim 30, wherein the logic for modifying the at least one property comprises logic for changing the position of the computer-based module within the zone.

32. The computer-readable medium of claim 30, wherein the logic for modifying the at least one property comprises logic for changing the size of the computer-based module.

33. The computer-readable medium of claim 30, wherein the logic for modifying the at least one property comprises logic for selecting a desired classification of information for the computer-based module to display on the page.

34. The computer-readable medium of claim 30, wherein the logic for modifying the at least one property comprises logic for moving the computer-based module from a first zone to a second zone on the page.

* * * * *